United States Patent [19]

Simmons

[11] Patent Number: 5,458,866
[45] Date of Patent: Oct. 17, 1995

[54] PROCESS FOR PREFERENTIALLY OXIDIZING SULFIDES IN GOLD-BEARING REFRACTORY ORES

[75] Inventor: Gary L. Simmons, Albuquerque, N.M.

[73] Assignee: Santa Fe Pacific Gold Corporation, Albuquerque, N.M.

[21] Appl. No.: 196,020

[22] Filed: Feb. 14, 1994

[51] Int. Cl.[6] .................... C22B 11/00; C01G 7/00
[52] U.S. Cl. ............................. 423/30; 423/27
[58] Field of Search .......... 423/27, 30; 75/744

[56] References Cited

U.S. PATENT DOCUMENTS

| | | | |
|---|---|---|---|
| 2,777,764 | 1/1957 | Hedley et al. | 75/105 |
| 3,293,027 | 12/1966 | Macklw et al. | 75/119 |
| 3,961,908 | 6/1976 | Touro | 23/290 |
| 4,070,182 | 1/1978 | Genik-Sas-Berezowsky et al. | 75/103 |
| 4,266,972 | 5/1981 | Redondo-Abad et al. | 75/101 |
| 4,304,644 | 12/1981 | Victorovich et al. | 204/108 |
| 4,405,569 | 9/1983 | Dienstbach | 423/27 |
| 4,505,744 | 3/1985 | Weir et al. | 75/120 |
| 4,552,589 | 11/1985 | Mason et al. | 75/105 |
| 4,571,263 | 2/1986 | Weir et al. | 75/101 R |
| 4,571,264 | 2/1986 | Weir et al. | 75/101 R |
| 4,578,163 | 3/1986 | Kunter et al. | 204/110 |
| 4,605,439 | 8/1986 | Weir | 75/118 R |
| 4,606,763 | 8/1986 | Weir | 75/101 R |
| 4,606,766 | 8/1986 | Genik-Sas-Berezowsky et al. | 75/118 R |
| 4,610,724 | 9/1986 | Weir et al. | 75/118 R |
| 4,629,502 | 12/1986 | Sherman et al. | 423/30 |
| 4,632,701 | 12/1986 | Genik-Sas-Berezowsky et al. | 75/118 R |
| 4,647,307 | 3/1987 | Raudsepp et al. | 75/118 R |
| 4,654,079 | 3/1987 | Nunez et al. | 423/30 |
| 4,676,828 | 6/1987 | Andre | 75/101 R |
| 4,731,114 | 3/1988 | Ramadorai et al. | 75/118 R |
| 4,738,718 | 4/1988 | Bakshani et al. | 75/105 |
| 4,786,323 | 11/1988 | Gock et al. | 75/118 R |
| 4,816,234 | 3/1989 | Brison et al. | 423/27 |
| 4,902,345 | 2/1990 | Ball et al. | 75/118 R |
| 4,923,510 | 5/1990 | Ramadorai et al. | 423/29 |
| 4,979,987 | 12/1990 | Mason et al. | 75/744 |
| 5,071,477 | 12/1991 | Thomas et al. | 75/744 |
| 5,190,578 | 3/1993 | Feldman | 75/747 |
| 5,232,491 | 8/1993 | Corrans et al. | 75/743 |
| 5,236,676 | 8/1993 | Touro et al. | 423/29 |
| 5,256,189 | 10/1993 | Patel et al. | 75/744 |

Primary Examiner—Steven Bos
Attorney, Agent, or Firm—Sheridan Ross & McIntosh

[57] ABSTRACT

A process is provided for recovering gold from refractory sulfide ores. Preferred feed materials have multiple different sulfide mineralogies, with gold being primarily contained within one or more, but not all, of the sulfide mineralogies. Sulfide mineralogies with the highest gold values are preferentially oxidized, while those sulfide mineralogies with relatively little gold remain largely unoxidized. In one embodiment, dissolved arsenic following pressure oxidation is precipitated as ferric arsenate through the control of pH during neutralization. In another embodiment, the oxidized slurry following pressure oxidation is contacted with an oxidizing agent to convert at least a portion of ferrous iron to ferric iron. Following, pressure oxidation, the slurry can be subjected to cyanidation recovery of gold, and liquid from the tailings stream can be recycled upstream of the pressure oxidation step in a substantially untreated form. The process is useful for recovering gold contained as ultra-small masses in sulfide minerals.

54 Claims, 12 Drawing Sheets

PROCESS FOR PREFERENTIALLY OXIDIZING SULFIDES IN GOLD-BEARING REFRACTORY ORES

FIELD OF THE INVENTION

The present invention relates to the recovery of gold from gold-bearing refractory ores.

BACKGROUND OF THE INVENTION

One common technique for recovering gold from gold-bearing ore and other gold-bearing materials, such as ore concentrates, involves leaching gold from the ore using a solution having a cyanide salt, typically sodium cyanide. The gold is complexed with cyanide in the leach solution and thereby removed from the ore material. The cyanide complexed gold is then adsorbed onto granules of activated carbon.

In one process, commonly referred to as a carbon-in-pulp process, the gold is first leached into a cyanide solution. The loaded leach solution is then contacted with activated carbon granules to adsorb the cyanide complexed gold. In another method, called the carbon-in-leach method, leaching of gold to form the cyanide complex and adsorbing of the complex onto activated carbon is performed in a single operation. Activated carbon granules are present in the ore slurry when the ore is being leached and cyanide complexed gold is adsorbed onto the activated carbon as the leach progresses. Typically, the activated carbon is moved in a counter-current flow relative to the flow of the ore being leached.

After adsorbing cyanide complexed gold, the loaded carbon granules are separated from the slurry and the cyanide-gold complex is stripped from the loaded carbon into a hot caustic cyanide solution. The gold is then recovered from the strip solution by normal refining techniques, such as by electrowinning of the gold from solution.

Normal cyanidation processes, such as the ones just described, are effective at recovering high percentages, often in excess of 80 or 90 percent, of gold from many gold-bearing ores. There are, however, several gold-bearing ores for which only very low, unsatisfactory gold recoveries are possible using normal cyanidation techniques. These difficult-to-process ores are often referred to as refractory, indicating that they offer unsatisfactory gold recoveries using normal cyanidation techniques. As used herein, a refractory ore is an ore from which less than 80 percent of the gold is recoverable by normal cyanidation processes.

The refractory nature of an ore may be caused by various materials in the ore. For example, gold-bearing ores can be rendered refractory by the presence of significant quantities of organic carbon materials in the ore. Also, gold in some ores, referred to as refractory sulfide ores, is contained in sulfide minerals present in the ore. Gold contained in sulfide minerals is often highly resistant to leaching by a cyanide solution.

Several processes have been proposed for recovering gold from refractory ores. Many of those processes involve pre-processing of the ore prior to subjecting it to cyanidation. For example, it has been proposed that ores having significant organic carbon content may be subjected to a chlorination treatment prior to cyanidation.

With respect to refractory sulfide ores, several processes have been proposed that involve pressure oxidation of the ore at elevated temperature and pressure in an autoclave in the presence of oxygen to decompose sulfide minerals. The ore is thereby rendered more amenable to subsequent cyanidation recovery of gold.

Pressure oxidation, however, is expensive. Substantial energy must be supplied to heat materials to a suitable temperature to initiate the exothermic oxidation reaction. Autoclave equipment must be designed for high temperatures and pressures and must be highly resistant to corrosion.

The cost of consumed chemicals is also a major concern. Oxygen must be supplied to the autoclave typically at high pressure and in a purified form. Also, acid, typically sulfuric acid, is often added to the slurry prior to oxidation. Additional sulfuric acid is also normally formed in the slurry during pressure oxidation as sulfide sulfur in sulfide minerals is oxidized to the sulfate form. Acid exiting the autoclave following pressure oxidation, whether added or generated, is unsuitable for cyanidation, which generally requires a basic pH. Acid in the slurry must, therefore, be neutralized by the addition of a base material, such as lime, prior to cyanidation.

There is, therefore, a considerable need for efficient processes which reduce those energy and chemical costs, while providing for allowing recovery of high percentages of available gold.

SUMMARY OF THE INVENTION

The present invention provides a process for recovering gold from solid particulate material feed, such as gold-bearing ores. The solid particulate material feeds suitable for the process of the present invention include materials having sulfide sulfur mineralizations containing gold. A portion of sulfide sulfur in the sulfide minerals is pressure oxidized, facilitating subsequent recovery of gold, such as by cyanidation of the oxidized slurry.

In one embodiment, pressure oxidation is conducted in the presence of oxygen gas to form an oxidized slurry, with the pressure oxidation being at a temperature of from about 155° C. to about 180° C., a total pressure of from about 100 psig to about 260 psig, and an oxygen gas overpressure of from about 25 psig to about 125 psig.

In another embodiment, substantially less than all of the sulfide sulfur in feed materials is oxidized. In a preferred embodiment, from about 20 percent to about 80 percent of the sulfide sulfur is oxidized during pressure oxidation. One preferred embodiment has solid particulate feed material comprising a first sulfide mineralogy containing substantial gold and a second sulfide mineralogy, which is different than the first sulfide mineralogy and contains relatively little gold. The first sulfide mineralogy is pressure oxidized preferentially relative to the second sulfide mineralogy, thereby permitting high gold recoveries without the processing complexities and expense of oxidizing substantially all sulfide sulfur.

In one embodiment, the first sulfide mineralogy comprises fine grained pyrite and the second sulfide mineralogy comprises coarse grained pyrite. In another embodiment, the first sulfide mineralogy comprises medium grained pyrite and the second sulfide mineralogy comprises coarse grained pyrite. In another embodiment, first sulfide minerals comprise blastic pyrite grains and the second sulfide mineralogy comprises euhedral coarse grained pyrite. In another embodiment, the first sulfide mineralogy comprises marcasite and the second sulfide mineralogy comprises pyrite. In another embodiment, the first sulfide mineralogy comprises arsenopyrite, arsenous pyrite or another arsenic-rich sulfide and the second sulfide mineralogy comprises pyrite. In one preferred embodiment, the first sulfide mineralogy is an arsenic-containing pyrite, such as arsenopyrite, which is present as an overgrowth and/or innergrowth mineralogy on second sulfide mineralogy grains comprising coarse grained pyrite. In one preferred embodiment, greater than about 70 percent of sulfide sulfur in the first sulfide mineralogy is oxidized while less than about 30 percent of the sulfide sulfur in the second sulfide mineralogy is oxidized.

In one embodiment, the oxidized slurry is neutralized following pressure oxidation. In a preferred embodiment, the neutralization occurs in multiple stages in series, with the pH of the slurry being raised to from about 3.5 to about 5 in the first stage to promote precipitation of dissolved arsenic as ferric arsenate, and to substantially avoid precipitation of other arsenates, and particularly to avoid precipitation of calcium arsenate, which is less stable for purposes of disposal.

In one embodiment, following pressure oxidation the oxidized slurry is contacted with an oxidizing agent, which is preferably oxygen gas which may be provided in the form of air, to oxidize ferrous iron in solution in the slurry to ferric iron. In a preferred embodiment, greater than about 500 standard cubic feet of air is sparged through the slurry per ton of solid particulate material originally in the feed to the process. In another preferred embodiment, the oxidation of ferrous iron to ferric iron occurs concurrently with neutralization of the slurry.

In one embodiment, a feed slurry is subjected to pressure oxidation substantially in the absence of the addition of any acid to the feed slurry prior to pressure oxidation. In a preferred embodiment, solid particulate feed material comprises no significant amount of carbonate materials.

In one embodiment, the solid particulate feed material to the process comprises ultra-small gold masses contained in sulfide minerals and the recovery of gold from such ultra-small gold masses. Such ultra-small gold masses are colloidal size or smaller, and may be present in solid solution form in the sulfide minerals.

In one embodiment, following pressure oxidation, the oxidized slurry is subjected to cyanidation to complex gold with a cyanide. The complexed gold is then removed from the oxidized slurry, forming a gold barren tailings stream. Liquid from the tailings stream is separated from tailings particulates and the liquid is recycled to upstream of pressure oxidation substantially in the absence of treatment of the recycled liquid to reduce the amount of cyanide in the recycle stream. In a preferred embodiment, solid particulate material feed to the process comprises no significant amount of organic carbon material.

DETAILED DESCRIPTION

Figure 1:
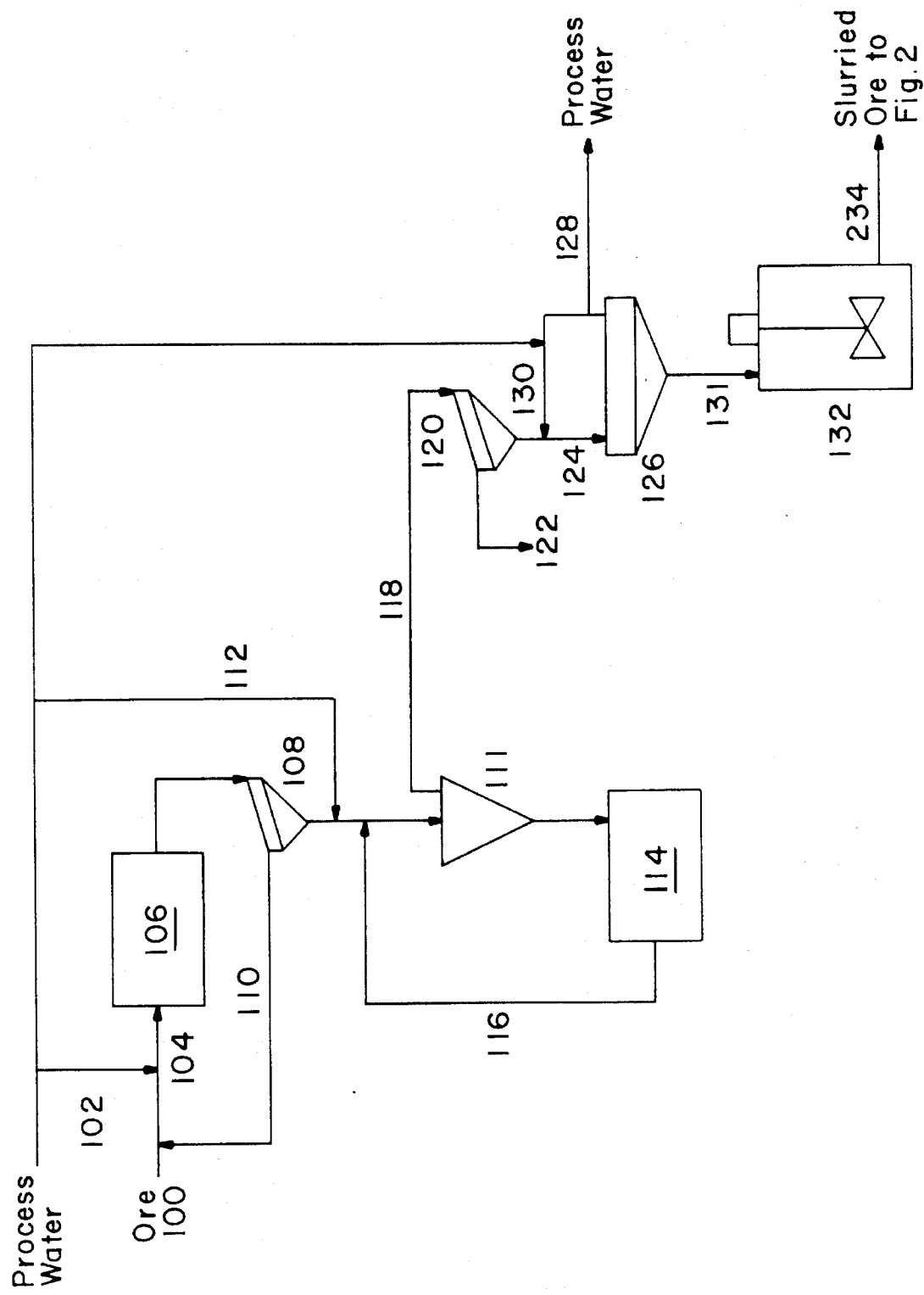
FIG. 1 is a process flow diagram of feed preparation for one embodiment of the process of the present invention.

The present invention provides a process for recovering gold from gold-bearing particulate matter and involves pressure oxidation of refractory sulfide minerals, such as are found in many gold-bearing ores. The pressure oxidation is conducted at elevated temperature and pressure in the presence of oxygen gas. Although it is possible to add the oxygen gas during pressure oxidation using air, a purified oxygen gas stream is preferred. The pressure oxidation is conducted in a pressure vessel, such as in one or more autoclaves, designed for hot, corrosive internal conditions. Such autoclaves are commercially available. They usually have special materials of construction to withstand the hostile conditions encountered during pressure oxidation. Typically, retention time in the autoclave during pressure oxidation is from about 15 minutes to about 90 minutes, preferably from about 30 minutes to about 75 minutes, and more preferably from about 45 minutes to about 60 minutes. Following pressure oxidation, gold can then be recovered from the oxidized slurry by any suitable gold recovery technique, and preferably by cyanidation.

Feed materials for the process of the present invention include any solid particulate material containing gold, wherein the gold is contained within one or more sulfide minerals. Feed materials include any sulfide minerals, including all forms of pyrite, marcasite, arsenopyrite, arsenous pyrite, and pyrrhotite.

The process of the present invention is particularly useful for feed materials in which multiple sulfide mineralogies are present, and in which the gold is primarily associated with one or more sulfide mineralogies and in which one or more other sulfide mineralogies are also present that are substantially unassociated with gold, or are associated with only minor amounts of gold.

A preferred solid feed material has one or more first sulfide mineralogy with which gold in the ore is primarily associated, accounting for the majority of gold in the ore. Presence of the first sulfide mineralogy significantly interferes with gold recovery by normal cyanidation techniques. The preferred solid feed material also has one or more second sulfide mineralogy with which a substantially smaller amount of the gold is associated. Preferably, the second sulfide mineralogy has no more than a minor amount of the gold. Unlike the first sulfide mineralogy, the second sulfide mineralogy does not substantially interfere with normal cyanidation techniques for recovering gold, because there is little gold to recover from the second sulfide mineralogy.

It has been discovered that with such feed materials, and particularly with certain gold-bearing ores, the process of the present invention can be used to preferentially oxidize one or more first sulfide mineralogy containing significant gold values while leaving unoxidized a substantial portion of one or more second sulfide mineralogy containing little or no gold. The invention, therefore, provides a significant advantage over prior art processes which require essentially complete oxidation of all sulfide minerals to attain reasonable gold recoveries.

Such preferential oxidation according to the present invention provides significant technical and economic advantages. First, the consumption of expensive chemicals is reduced significantly. Because a significant amount of sulfides remain unoxidized, oxygen consumption is significantly reduced. Also, less sulfuric acid is produced, thereby reducing the amount of base material, as discussed below, that must be added to the oxidized slurry to neutralize acid. Additionally, disposal advantages result because sulfides that remain unoxidized are typically very chemically stable and are easily disposed of. Moreover, as discussed more fully below, preferential oxidation according to the present invention is often possible at relatively low oxidation pressures, thereby reducing heating requirements and resulting in a less severe internal environment in the autoclave during pressure oxidation. The lower temperature and pressure conditions provide significant reductions in equipment costs as well as providing a safer working environment.

In a preferred embodiment, the solid particulate material feed for the present invention has no significant amount of carbonate materials. As used herein, an amount of carbonate materials is not significant if the carbonate materials are present in an amount that does not detrimentally affect gold recovery. Carbonate levels of less than about 1.50 weight percent are preferred, with carbonate levels of less than about 0.50 weight percent being particularly preferred. Also, a preferred solid particulate material feed has no significant amount of organic carbon. As used herein, an amount of organic carbon is not significant if the organic carbon is present in an amount that does not detrimentally affect gold recovery. It should be recognized that the actual amount of organic carbon which can be tolerated is dependent upon the activity of that organic carbon and its ability to adsorb a gold-cyanide complex. Organic carbon levels of less than about 0.50 percent are preferred, with organic carbon levels of less than about 0.20 percent being particularly preferred.

As noted, one class of feed materials for which the process of the present invention is particularly suited includes materials having gold associated primarily with one but not all of a plurality of sulfide mineralogies present in the feed. Such different mineralogies may be primarily due to compositional or to structural differences, or to a combination of the two. For example, some gold-bearing ores contain both arsenic-rich sulfide minerals, such as arsenopyrite (FeAsS) and arsenous pyrite, and other sulfide minerals such as pyrite ($FeS_2$) or marcasite ($FeS_2$).

It has been found that sulfide sulfur in arsenic-containing sulfides can be oxidized preferentially to pyrite under the proper oxidizing conditions according to the present invention. If such ores have arsenic-containing sulfides that contain a substantial amount of gold and also have one or more pyrite mineralogies with which no or minor quantities of gold are associated, then the arsenic-containing sulfides can be preferentially oxidized relative to pyrite, thereby permitting recovery of gold contained in the arsenic-containing sulfides while leaving unoxidized a substantial portion of relatively gold-barren pyrite. The expense and operational complexities of oxidizing relatively gold-barren pyrite would thereby be avoided, providing significant operational and economic advantages, as discussed above.

In one particularly preferred embodiment, solid particulate feed material has pyrite grains which are coated about perimeter portions with an arsenic-rich overgrowth and/or innergrowth. Such arsenic-rich overgrowth and/or innergrowth comprises one or more arsenic-containing sulfides such as arsenopyrite and arsenous pyrite. These arsenic-rich overgrowth and/or innergrowth regions can contain significant gold values and can be preferentially oxidized relative to pyrite minerals.

It has also been found that marcasite in a solid particulate feed material can be preferentially oxidized relative to coarse grained pyrite under the proper conditions, according to the present invention. Therefore, ores in which substantial gold values are contained within marcasite can be treated to preferentially oxidize the marcasite and thereby release that gold for recovery, while leaving unoxidized a substantial portion of the coarse grained pyrite. This is particularly useful when a coarse grained pyrite mineralogy is present that contains minor or no gold values, because the complexity and expense of oxidizing such gold-barren pyrite can be avoided.

Additionally, it has been discovered that pyrite within an ore can be present in different mineralogical forms due to structure and that such different pyrite mineralogies can be preferentially oxidized. Generally, it has been found that the smaller the grain size of a pyrite mineralogy, the more susceptible a pyrite mineralogy generally is to pressure oxidation according to the present invention. Therefore, a fine grained pyrite will tend to oxidize preferentially to a medium grained pyrite, both of which will tend to oxidize preferentially to a coarse grained pyrite. When an ore, for example, comprises different pyrite mineralogies that have differing grain sizes, the pyrite mineralogy having the smaller grain size can be preferentially oxidized, while leaving unoxidized a substantial portion of the pyrite mineralogy having the larger grain size. This is particularly useful for ores in which significant gold values are contained in a pyrite mineralogy having a smaller grain size and only minor, or commercially insignificant, gold values are contained in a pyrite mineralogy having a larger grain size.

As used herein, fine grained refers to a grain size of smaller than about 10 microns. Medium grained refers to a grain size of from about 10 microns to about 20 microns. Coarse grained refers to a grain size of larger than about 20 microns and preferably larger than about 30 microns. These grains may be present in single crystals or may be cemented together or otherwise bound in larger aggregates. As used herein, grain size refers to the size of discrete crystalline or semi-crystalline masses of mineralization, whether those discrete masses are present in larger agglomerates or as isolated grains.

Furthermore, it has been found that mineralogies containing significant internal porosity can often be preferentially oxidized relative to other mineralogies having little or no such internal porosities. For example, blastic pyrite grains (i.e., those that are highly fractured) oxidize more readily than comparably sized euhedral or anhedral pyrite grains. Also, fine grained or medium grained pyrites in an agglomerate having significant porosity will oxidize more readily than coarse grained pyrite having little or no porosity. Porosity in such fine grained and medium grained aggregates can be in any form, but is often in the form of vugular cavities.

The process of the present invention has been found to be effective for recovering gold contained as ultra-small masses in sulfide mineralogies. Such ultra-small gold masses include those of colloidal size and smaller, including gold in a solid solution. As used herein, colloidal size gold masses refers to gold masses of a size smaller than about 1000 angstroms and larger than about 10 angstroms. Solid solution refers to a homogenous crystal structure with two or more chemical species. Gold in solid solution is, therefore, an insertion or replacement of gold into a mineral crystal structure, such as in a sulfide mineral crystal structure, at an atomic or near-atomic level. As used herein, solid solution gold includes gold masses of a size smaller than about 10 angstroms down to the size of a single gold atom (atomic radius of approximately 1.79 angstroms).

The solid particulate material which can be processed according to the present invention includes any type of solid particulate material having gold that is rendered refractory to cyanidation techniques due to association of gold with sulfide minerals. Such solid particulate materials include ores, ore concentrates, and mine or milling tailings from previous operations in which substantial amounts of gold still remain.

The solid particulate material to be processed should be in the form of particles that are small enough in size to permit adequate oxidation of sulfide minerals during pressure oxidation and to permit efficient subsequent cyanidation of the oxidized slurry. Typically, solid particulate material feed should comprise particles of a size smaller than about 100 mesh, and preferably smaller than about 200 mesh. It will often be necessary to grind or otherwise comminute solid feed materials to attain the desired particle size. Such comminution can be accomplished, for example, by wet grinding or milling. Typically, comminution to a particle size where 80 weight percent of the particles pass a 200 mesh screen is adequate.

Solid particulate material of the proper size is slurried with a liquid to form a feed slurry. Preferably, the liquid is an aqueous liquid, which normally comprises process water. The feed slurry density is typically from about 20 percent to about 60 percent solids by weight, and preferably from about 40 percent to about 50 percent solids by weight.

In one embodiment, the present invention provides a process in which only part of the sulfide sulfur in sulfide minerals of the feed slurry is oxidized during pressure oxidation. Preferably, greater than about 20 percent, more preferably greater than about 30 percent, and most preferably greater than about 40 percent of sulfide sulfur is oxidized and, also, preferably less than about 90 percent, more preferably less than about 85 percent, still more preferably less than about 80 percent, and most preferably less than about 70 percent of sulfide sulfur is oxidized. One particularly preferred range is for oxidation of from about 40 percent to about 80 percent of sulfide sulfur in sulfide minerals of the feed slurry.

Preferably, the feed slurry comprises a first sulfide mineralogy, or mineralogies, with which gold is substantially associated and a second sulfide mineralogy, or mineralogies, with which gold is substantially unassociated, as previously discussed. Sulfide sulfur of such first sulfide mineralogy is preferentially oxidized while sulfide sulfur of such second sulfide mineralogy is preferentially not oxidized during pressure oxidation. Preferably, greater than about 70 percent, more preferably greater than about 80 percent, and most preferably greater than about 90 percent of sulfide in such first sulfide mineralogy is oxidized and, also, preferably less than about 40 percent, more preferably less than about 30 percent, and most preferably less than about 20 percent of sulfide sulfur in such second sulfide mineralogy is oxidized. Such first and second mineralogies can be any mineralogies for which the first sulfide mineralogy will preferentially oxidize relative to the second sulfide mineralogy, as discussed previously.

In one embodiment, pressure oxidation is conducted at a temperature which is preferably greater than about 155° C., more preferably greater than about 160° C., and most preferably greater than about 165° C., and with the temperature also being preferably less than about 180° C., more preferably less than about 178° C., and most preferably less than about 175° C. Below about 160° C., it becomes difficult to prevent the formation of elemental sulfur. Such elemental sulfur production can be avoided generally with temperatures in excess of 160° C., and preferably in excess of 165° C. One particularly preferred temperature for operating the pressure oxidation of the present invention is at about 170° C.

Pressure oxidation is preferably conducted at a total pressure of greater than about 100 psig, more preferably greater than about 125 psig, and most preferably greater than about 190 psig, with the pressure also being preferably less than about 260 psig. One particularly preferred operating pressure is at about 235 psig.

It has been unexpectedly found that operation of the pressure oxidation under the narrow temperature and pressure conditions listed above results in efficient preferential oxidation of first sulfide sulfur in a first sulfide mineralogy while preferentially not oxidizing second sulfide sulfur in second sulfide mineralogy. Gold contained in first sulfide mineralogy can thereby be released during pressure oxidation without incurring substantial additional expense of oxidizing a large portion of the second sulfide mineralogy.

It has been found, surprisingly, that the selectivity of oxidation relative to different mineralogies of sulfide minerals is mostly affected by temperature. Retention time and oxygen overpressure also affect selectivity of oxidation, but to a lesser degree. Lower temperatures appear to result in more selective preferential oxidation. As the temperature descends to about 160° C., however, elemental sulfur formation begins to become a problem, as previously discussed. Above about 180° C., the selectivity of preferential oxidation appears to decrease, which may be caused by higher reaction kinetics that make it more difficult to accurately control the preferential oxidation at higher temperatures. Also, the lower pressure oxidation temperatures of the present invention, relative to many prior art pressure oxidation processes, provides an added benefit of easier operation and lower heating requirements.

An overpressure of oxygen gas is fed to the reactor vessel during pressure oxidation. As used herein, oxygen gas overpressure refers to the pressure of oxygen gas feed into the reactor vessel over and above the pressure exerted by other gaseous constituents in the pressure vessel at the temperature at which the pressure oxidation is conducted. Typically, these other gaseous constituents mainly comprise water vapor at the pressure oxidation operating conditions. Also, steam may be added to the reactor vessel as required to provide necessary heat to assure that the exothermic oxidation reaction is initiated and continues.

Oxygen gas can be provided to the reactor in any manner, such as by the addition of air. Preferably, however, purified oxygen gas is fed to the reactor vessel, thereby reducing the total pressure requirement in the vessel for a given oxygen overpressure. Oxygen overpressure to the reactor during pressure oxidation is preferably greater than about 25 psig, more preferably greater than about 50 psig, and most preferably greater than about 75 psig, and is also preferably less than about 125 psig. Particularly preferred is operation at about 100 psig oxygen overpressure.

In one embodiment, acid, typically sulfuric acid, may be added to the feed slurry to decompose carbonates in the solid particulate material feed prior to subjecting the feed slurry to pressure oxidation. Preferably, however, no such acid pretreatment is conducted prior to the pressure oxidation, and the feed slurry is fed to the pressure oxidation reactor substantially in the absence of the addition of any such acid. It has been found that such acid pretreatment is unnecessary in combination with the pressure oxidation of the present invention, particularly with the preferred solid particulate material feeds which comprise no significant quantities of carbonate materials as previously discussed. The presence of significant amounts of carbonate material tends to interfere with pressure oxidation by consuming sulfuric acid produced during pressure oxidation.

Exiting from the pressure oxidation reactor is an oxidized slurry from which gold can be recovered. One preferred method for recovering gold from the oxidized slurry is to subject the oxidized slurry to a cyanidation process. Such cyanidation may be any effective cyanidation process whereby a cyanide, preferably in an aqueous solution, is used to form a complex with gold in the oxidized slurry. Gold may be recovered from the cyanide complex by any appropriate means. For example, cyanide complexed gold could be adsorbed onto activated carbon and the gold-cyanide complex could thereafter be stripped from the activated carbon and sent to a gold product refining operation. The cyanidation process could involve, for example, a carbon-in-pulp process or a carbon-in-leach process. A carbon-in-pulp process is preferred.

As used herein, cyanide refers to the cyanide grouping, CN, which in an aqueous solution is present in ionic form. Typically, a solution containing dissolved sodium cyanide is used. As used herein, a complex of cyanide and gold refers to an association of gold and one or more cyanide ions in solution whereby the gold is held by the cyanide ion or ions. Gold typically complexes with cyanide, for example, to form aurocyanide.

The oxidized slurry, which results from pressure oxidation, is normally highly acidic, usually comprising a significant amount of free sulfuric acid. The amount of such free sulfuric acid, however, is reduced according to the process of the present invention due to the preferential oxidation of sulfide sulfur in some sulfide mineralogies over sulfide sulfur in other sulfide mineralogies, as previously discussed.

The oxidized slurry is normally neutralized prior to cyanidation. A pH of greater than about 9, and typically from about 10 to about 11, is preferred for cyanidation. The pH of the oxidized slurry can be raised into the desired range by the addition of base material. As used herein, base material refers to any material which, when added to the oxidized slurry, will result in a raising of the pH of the slurry, and includes any material which will form a base when added to the slurry. Base materials include ammonium and metal hydroxides, and particularly those of alkali and alkaline earth metals, as well as materials from which such hydroxides can be formed, such as metal oxides, carbonates and ammonium. Preferred base materials are calcium oxide (e.g., lime) and calcium carbonate (e.g., limestone), which are preferably slurried in water prior to addition to the oxidized slurry.

In one embodiment, neutralization is accomplished in the process of the present invention in a plurality of neutralization stages arranged in series, with addition of base material in each stage. Preferably, at least three neutralization stages are used.

Multiple stage neutralization is particularly preferred when the particulate feed material comprises significant amounts of arsenic, such as would be the case for ores that have significant amounts of arsenides or that have significant amounts of arsenopyrite or arsenous pyrite. During pressure oxidation, at least a portion of such arsenic goes into solution in the oxidized slurry. A significant amount of iron also typically goes into solution. It is possible to precipitate arsenic from solution in the oxidized slurry as ferric arsenate if multiple neutralization stages are used.

The oxidized slurry from the pressure oxidation reactor is typically very acidic, often having a pH of less than about 1.5. Preferably, the pH of the first neutralization stage is held to a pH of from about 3.5 to a pH of about 5 for a time sufficient to allow for the selective precipitation of arsenic as ferric arsenate, thereby avoiding precipitation of more soluble arsenates, such as calcium arsenate which, because of its higher solubility, has the potential for creating a disposal problem. The retention time is preferably greater than about 30 minutes and more preferably greater than about one hour in the first neutralization stage. Preferably, the temperature during neutralization is from about 80° F. to about 180° F., and more preferably from about 100° F. to about 140° F. The oxidized slurry is then neutralized to a pH of greater than 10, and preferably from about 10 to about 11, in one or more subsequent neutralization stage.

It has been found that a significant amount of ferrous iron is typically present in solution in the oxidized slurry following pressure oxidation according to the present invention. Such ferrous iron can interfere with cyanidation and can consume significant quantities of cyanide if present during cyanidation. In one embodiment, an oxidizing agent is added to the oxidized slurry, following pressure oxidation, to oxidize at least a portion of ferrous iron to ferric iron. Preferably, substantially all ferrous iron is oxidized to ferric iron.

As used herein, oxidizing agent refers to any material capable of oxidizing ferrous iron to ferric iron. Preferably, the oxidizing agent is oxygen gas, which may be added in any suitable manner, such as by sparging air or purified oxygen gas through the oxidized slurry. Sparging with air is typically preferred.

It is not necessary that the oxidation of ferrous iron be conducted at elevated pressure. Air can be sparged through holding tanks that are vented to atmospheric pressure and which are, therefore, substantially unpressurized. In any event, the pressure at which oxidation of ferrous iron occurs is preferably substantially lower than the pressure utilized during pressure oxidation. In a preferred embodiment, oxidation of ferrous iron to ferric iron is conducted concurrently with neutralization, more preferably in multiple stages, as previously described. An oxidizing agent, such as an air sparge, is preferably added during each neutralization stage.

One important aspect of the present invention is the discovery that the preferential oxidation of sulfides according to the present invention provides a significant advantage concerning use of oxygen during pressure oxidation relative to use of oxidizing agents during subsequent treatment to oxidize ferrous iron to ferric iron. The relatively mild oxidizing conditions used in the pressure oxidation of the present invention to give the desired preferential oxidation of certain sulfide minerals also generally leaves more iron in solution in the oxidized slurry in the form of ferrous iron rather than as the more highly oxidized ferric iron. A significant advantage is achieved by avoiding the use of high cost purified oxygen delivered at high pressure during pressure oxidation to oxidize iron to the ferric form. A substantial amount of the iron is, instead, oxidized only to the ferrous form. Oxidation of the ferrous iron to ferric iron can then be beneficially accomplished at a lower pressure and temperature and, preferably using lower cost air, instead of the high pressure purified oxygen normally used during pressure oxidation.

Due to the often high concentrations of ferrous iron in the oxidized slurry of the present invention, however, high volumes of air feed are required to provide sufficient oxygen to oxidize substantially all of the ferrous iron to ferric iron. These air feed rates are substantially in excess of that which would be required to achieve oxidation of ferrous iron if pressure oxidation were to follow prior art processes that oxidize substantially all of sulfide sulfur in the feed slurry. Preferably, the oxidized slurry is treated with greater than about 300 standard cubic feet of air per ton of solid particulate material in the feed slurry, and more preferably in excess of 400 standard cubic feed of air per ton of solid particulate material in the feed slurry. A particularly preferred air rate is in excess of 500 standard cubic feet per ton, and more preferably from about 500 standard cubic feed per ton to about 600 cubic feet per ton. At 550 standard cubic feet per ton, with a 125 ton per hour feed of solid particulate material in the feed slurry, treatment with approximately 1145 standard cubic feet of air per minute would be required for oxidation of ferrous iron to ferric iron. If the neutralization occurs in three stages in series, concurrent with neutralization, then approximately 380 standard cubic feed of air per minute could be fed to each stage.

Following removal of gold from the oxidized slurry, such as by cyanidation, a refined gold product comprising purified metallic gold can be recovered. For example, a purified gold product can be recovered by electrowinning from the strip solution used to remove cyanide complexed gold from carbon granules following cyanide leaching.

In one embodiment of the present invention, after gold has been removed from the oxidized slurry, aqueous liquid from the oxidized slurry can be recycled to upstream of pressure oxidation for use in forming the feed slurry. Such recycle water could be added, for example, to an ore to perform wet grinding or milling.

Following removal of gold from the oxidized slurry, such as by cyanidation, the oxidized slurry becomes a tailing stream substantially barren of gold. The tailing stream has remaining solid particles, being tailing particles, and slurry liquid, being tailing liquid. The tailing liquid comprises residual dissolved cyanide from the cyanide leaching operation. It is common practice in the industry to treat such tailing liquid to reduce the concentration of cyanide prior to recycle to upstream of pressure oxidation, if such liquid is recycled at all. It has been found, however, that such treatment to reduce the amount of cyanide in the tailing liquid is unnecessary with the process of the present invention. This is particularly the case when the solid particulate material feed is a preferred material having no significant amount of organic carbon material, as previously discussed.

One embodiment of the process of the present invention will now be described with reference to FIGS. 1–3. Referring first to FIG. 1, solid particulate feed material 100 in the form of a gold-bearing sulfide ore at a feed rate of approximately 125 tons per hour is combined with process water 102 to form a feed slurry 104 which is then fed to a sag mill 106 where the ore is milled to a smaller size. Slurry from mill 106 then goes to screen 108 having a screen size of ⅜". Oversize particles 110 are recycled to the feed slurry for further processing. The feed slurry having undersize particles that pass screen 108 is then fed to cyclone 111. Additional process water 112 is added as necessary. Underflow from cyclone 111 is fed to ball mill 114 for additional comminution. The slurry 116 from mill 114 having the comminuted particulate solids is then recycled to upstream of cyclone 111. Overflow 118 from cyclone 111 then passes to screen 120, having a screen size of 35 mesh. Oversize particles 122 are disposed of as refuse. Undersize particles in slurry 124 from screen 120 are passed to thickener 126 where the slurry is thickened to a pulp density of about 50 weight percent solids by removal of liquid 128, as necessary. Additional process water 130 can be added to slurry 124 as necessary. Slurry 131 from thickener 126 is then fed to an agitated surge tank 132.

Figure 2:
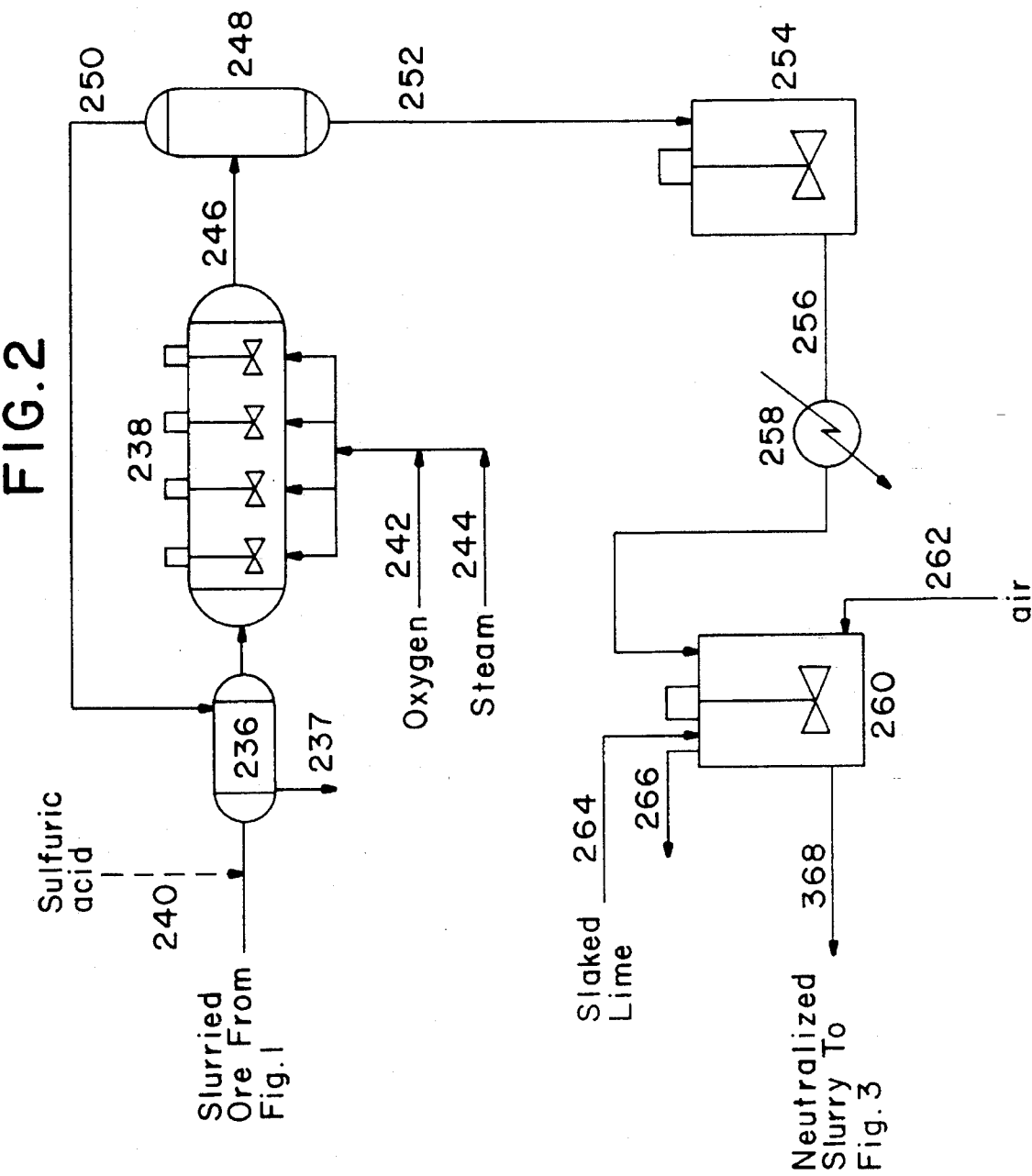
FIG. 2 is a process flow diagram of pressure oxidation and neutralization for one embodiment of the process of the present invention.

Referring now to FIG. 2, slurry 234 is heated in slurry heater 236 to about 120° C. and is then fed to a four-stage, agitated autoclave 238. It should be recognized that different ores, or ore concentrates, will have different heating requirements. Some feeds may require no heating at all. Other feed materials may require several stages of preheating. During normal operation, it is not necessary to add sulfuric acid to slurry 234 prior to entry into autoclave 238. However, sulfuric acid 240 can be added as necessary, such as during start-up of the process. Oxygen 242 and steam 244 are fed into autoclave 238 for pressure oxidation. Pressure oxidation is conducted in the autoclave 238 at a temperature of about 170° C. and a total pressure of about 205 psig. Oxygen overpressure to the autoclave is about 100 psig.

Oxidized slurry 246 from autoclave 238 passes through flash tank 248. Vapor 250 is taken overhead from flash tank 248 and used to preheat slurry 234 in slurry heater 236 prior to entry into autoclave 238. Vapor 250 is contacted with slurry 234 in slurry heater 236. Some of vapor 250 condenses in the process of heating slurry 234. Uncondensed vapor 237 is collected overhead from slurry heater 236 and is scrubbed prior to discharge to the atmosphere. If slurry preheating is required, the process may have one or more slurry heaters 236 in series or one or more flash tanks 248 in series as required for specific process embodiments.

The oxidized slurry 252 from flash tank 248 is then sent to agitated surge tank 254. The slurry 256 from surge tank 254 is then cooled 258 to about 100° F. and is then sent to a neutralization tank 260. Three neutralization tanks 260 are arranged in series (not all shown).

Air 262 is sparged through each neutralization tank 260 at a combined rate of about 1145 standard cubic feet per minute to oxidize substantially all ferrous iron present in slurry 256 to ferric iron. Slaked lime (calcium oxide in water) 264 is added to each neutralization tank 260 to raise the pH to a pH of from about 3.5 to about 5 in the first stage and to a pH of about 10.5 in each of the second and third stages. Excess air and vaporous byproducts are vented 266.

Figure 3:
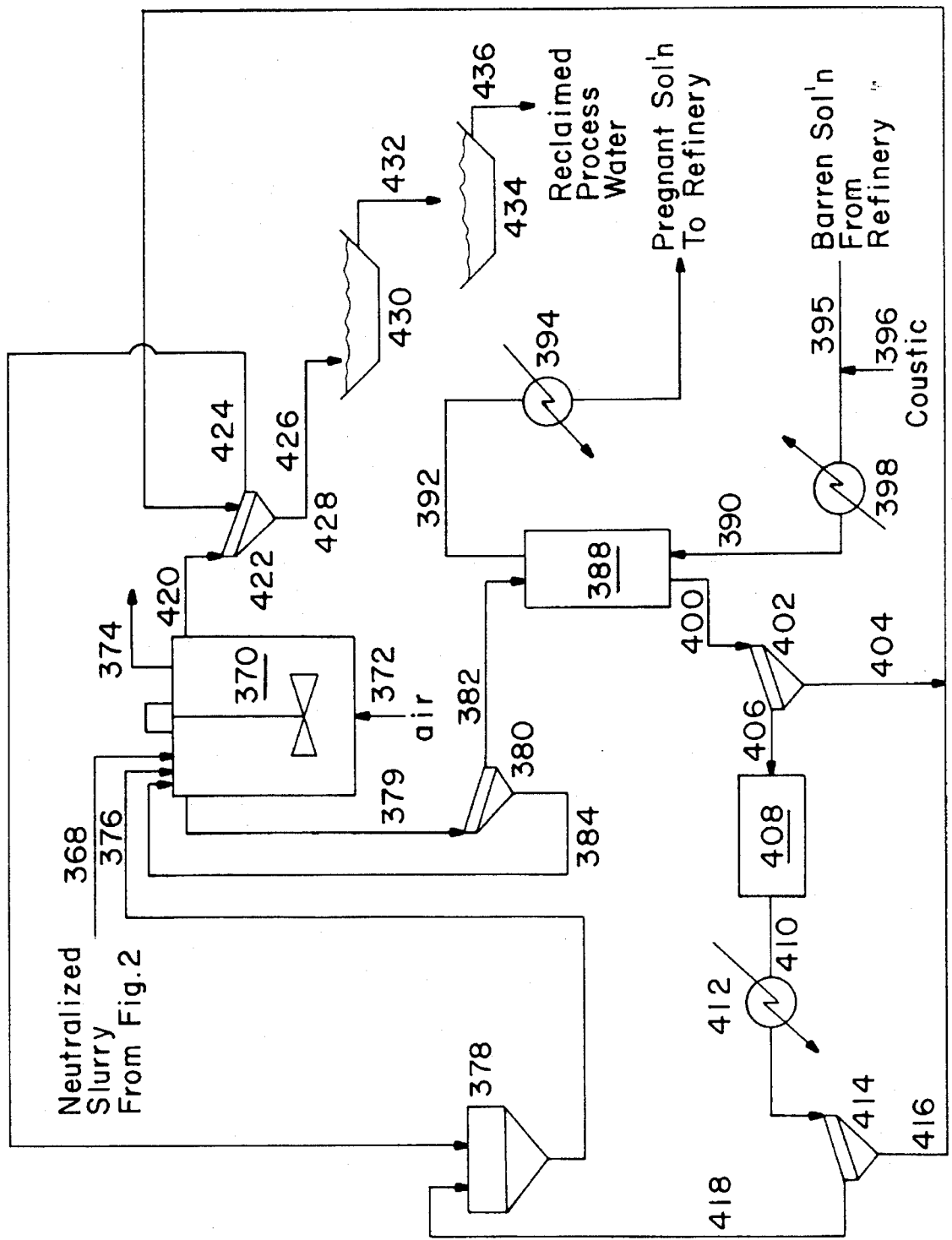
FIG. 3 is a process flow diagram of cyanidation for one embodiment of the present invention.

Referring now to FIG. 3, neutralized slurry 368 from neutralization tank 260 is fed to a carbon-in-leach tank 370. Six carbon-in-lead tanks, 370 are arranged in series (not all shown). Air 372 is sparged through each carbon-in-leach tank 370 at a rate sufficient to provide oxygen required for the cyanidation of gold in neutralized slurry 368. Excess gas is vented 374. Granules of activated carbon 376 from carbon tank 378 are fed into the last carbon-in-leach tank 370 in series. Slurry 379 having carbon granules that are loaded with adsorbed cyanide complexed gold is removed from the first carbon-in-leach tank 370 in series and is fed to screen 380 where loaded carbon granules 382 are removed from slurry 379 and underflow slurry 384 is recycled back to the first carbon-in-leach tank 370 in series.

Loaded carbon granules 382 are then sent to carbon strip vessel 388 and the carbon granules are contacted in batch with a hot caustic cyanide stripping solution 390. In carbon strip vessel 388, cyanide complexed gold is desorbed from the carbon granules and the loaded strip solution 392 is cooled 394 and sent to the gold refinery where a purified gold product is produced by electrowinning.

Gold barren solution 395 from the gold refinery 390 is mixed with caustic 396 as necessary and is heated 398 prior to being fed into carbon strip vessel 388. Stripped carbon granules 400 exiting carbon strip vessel 388 are then sent to screen 402 where carbon fines 404 are removed for disposal. Oversize carbon granules 406 are reactivated in kiln 408. Reactivated carbon granules 410 are then cooled 412 and fed to screen 414. Carbon fines 416 are removed for disposal and oversize reactivated carbon granules 418 are fed to carbon tank 378.

Gold barren slurry 420 from the last carbon-in-leach tank 370 in series is fed to screen 422 where oversize carbon granules 424 are removed and transferred to carbon tank 378. Tailing slurry 426 is fed to tailing pond 430 where tailing particulates settle and tailing liquid 432 is drawn off and transferred to a decant pond 434 for further clarification. Tailing liquid 436 from decant pond 434 is then reclaimed as process water for direct recycle within the process without further treatment.

The process of the present invention is further described by the following examples, none of which are limiting as to the scope of the invention claimed herein.

All examples show pressure oxidation and cyanidation using refractory sulfide ore samples from the Lone Tree Mine in Nevada. Sulfide ores from the Lone Tree Mine have several different sulfide mineralogies, only some of which contain significant gold values. Fine grained pyrite, which is typically present in agglomerates, has the highest gold values followed by medium grained pyrites. Blastic pyrite, marcasite and arsenic-containing sulfides such as arsenopyrite also contain significant gold values. Arsenic-rich pyrite is often present as an overgrowth and/or innergrowth on pyrite grains. Coarse grained pyrite, typically present as single coarse grained pyrite crystals, contain insignificant gold values. Table 1 shows average gold contents for samples of coarse grained, blastic, medium grained, and fine grained pyrite and also for marcasite.

TABLE 1

| Mineralogy | Average Gold Content (ppm) |
|---|---|
| Euhedral, coarse grained pyrite | 2.1 |
| Blastic pyrite grains | 25.2 |
| Euhedral, medium grained pyrite | 48.3 |
| Anhedral, fine grained pyrite | 103.2 |
| Marcasite | 33.8 |

Figure 6:
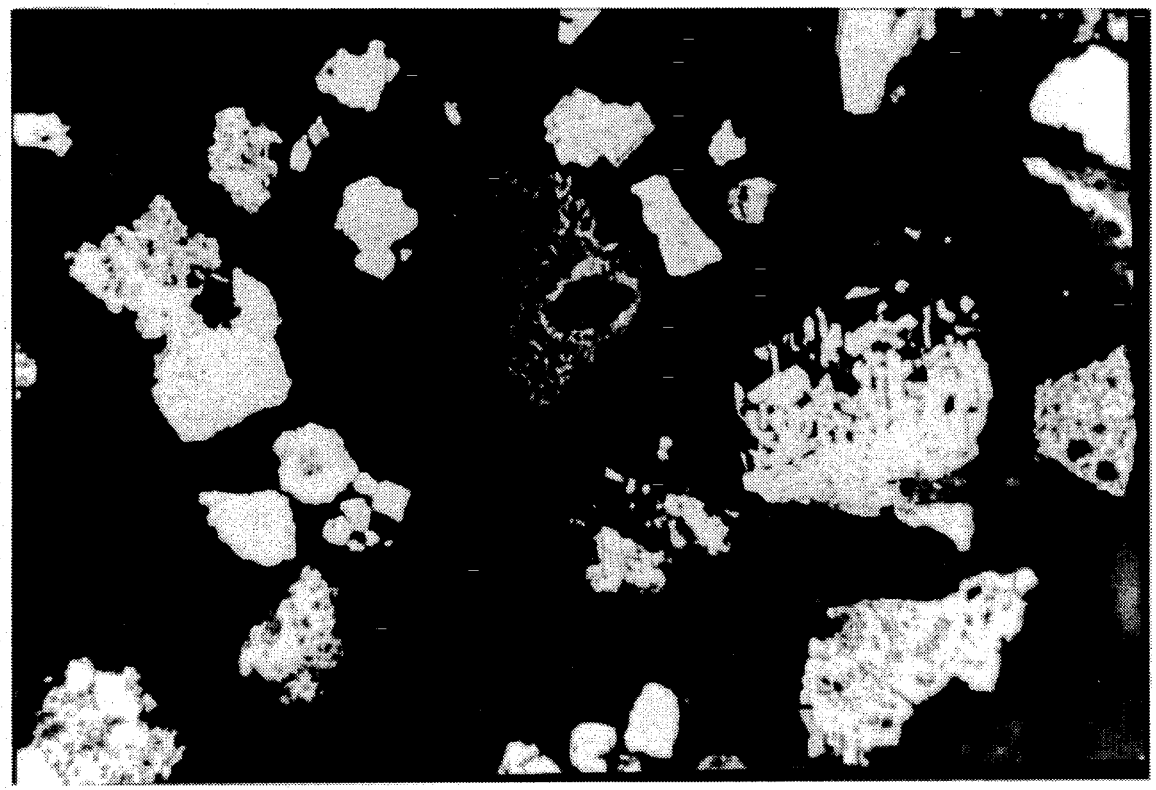
FIGS. 6–9 are photomicrographs of mineralogical species in a gold-bearing ore from the Lone Tree Mine in Nevada.

FIGS. 6–9 show photomicrographs of polished sections of particles of a sulfide ore from the Lone Tree Mine. FIG. 6 is a photomicrograph showing coarse grained single pyrite crystals, being the brighter appearing particles with no or little dark internal coloring. These coarse grained crystals contain very low, insignificant gold values. A good example is seen in FIG. 6 at the right side near the top, with the grain extending to the right outside of the field of view. Also shown are agglomerates of fine grained pyrites which contain high gold values. These agglomerates of fine grained pyrite are characterized by a high degree of porosity, rendering the fine grained pyrite susceptible to rapid oxidation, even at areas internal to the agglomerate. These fine grained aggregates are characterized by particles with substantial amounts of light and dark areas intermixed. Good examples are seen in FIG. 6 just above the center of the figure where the sprinkling of light colored areas is seen and also at the right side about midway up. Also shown in FIG. 6 is a coarse grained pyrite having an arsenic-rich overgrowth, such as possibly arsenopyrite, around the perimeter, which is seen at the center of FIG. 6 near the top, just above the fine grained aggregate. This arsenic-rich overgrowth contains significant gold values even though the interior pyrite grain does not.

Figure 7:

FIG. 7 is a photomicrograph showing marcasite blades having an arsenic-rich overgrowth region, such as of arsenopyrite. Note the vuggy nature of the marcasite which promotes rapid oxidation.

Figure 8:
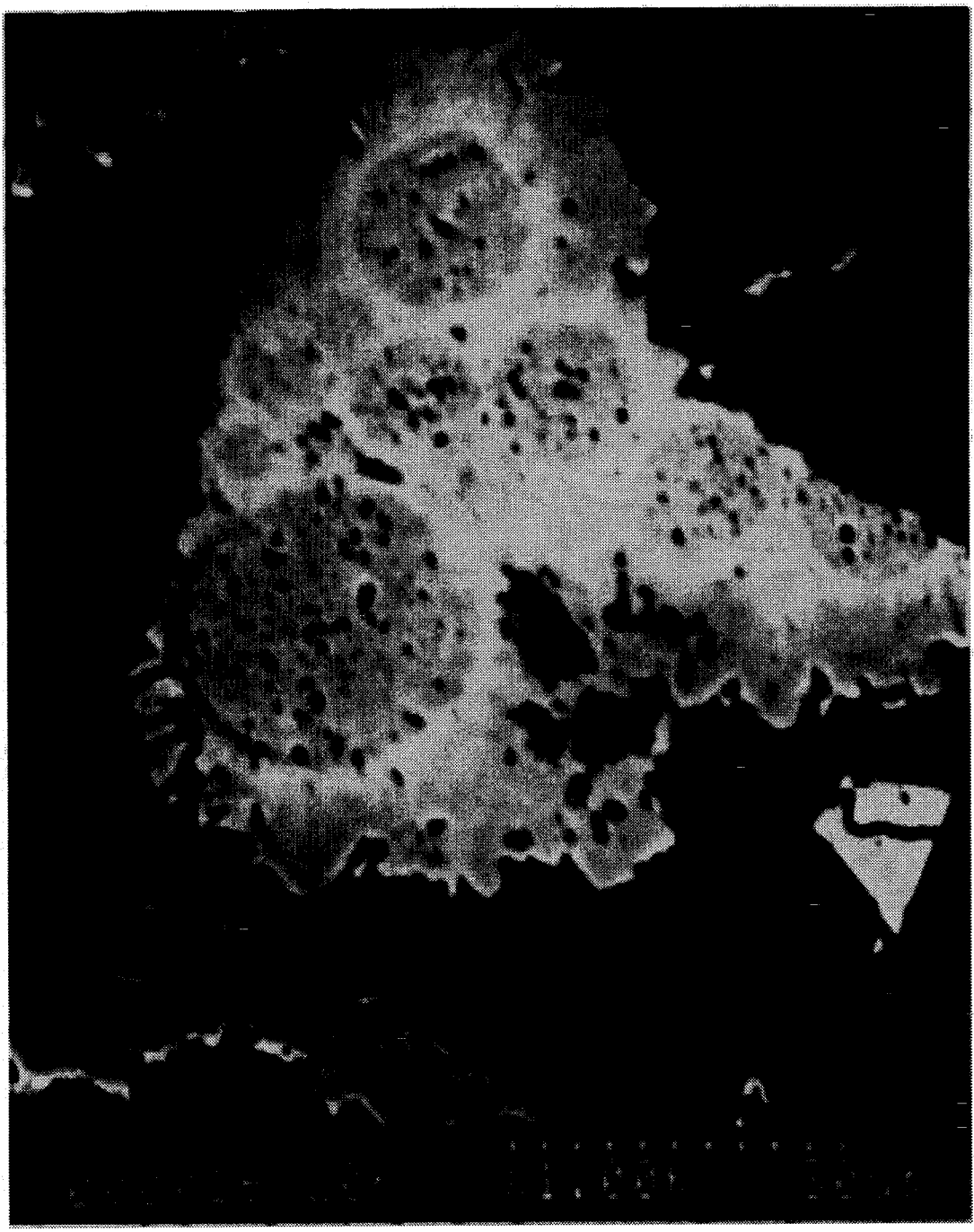

FIG. 8 is a photomicrograph showing an aggregate particle having circular areas of fine grained pyrite (pyrite framboids) having an arsenic-rich rimming/overgrowth region (bright circles), cemented together by fine grained pyrite/arsenous pyrite.

Figure 9:
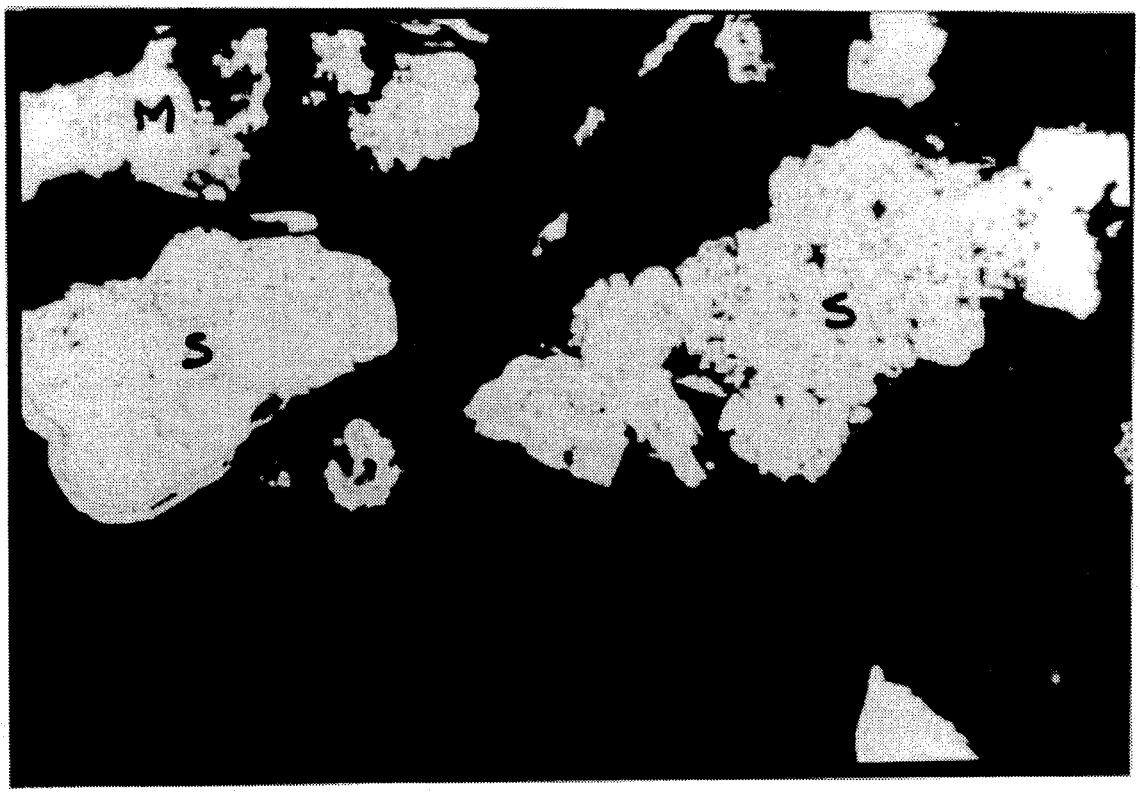

FIG. 9 is a photomicrograph showing composite grains (aggregates of fine grained porous pyrite), with one having an arsenic-rich overgrowth region (left). The porous nature of the aggregates is shown.

Figure 10:
FIGS. 10–12 are photomicrographs of remnants of mineralogical species following pressure oxidation.
Figure 11:
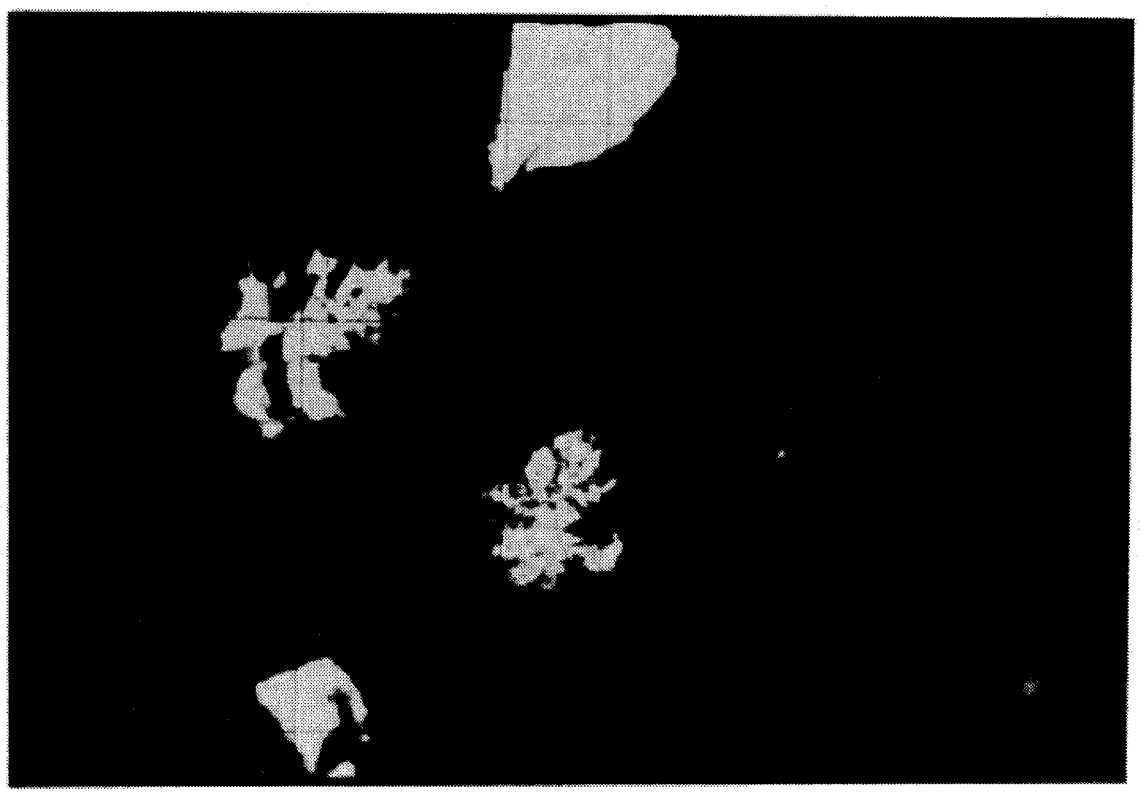
Figure 12:

FIGS. 10, 11 and 12 are photomicrographs of polished sections showing remnants of mineralogical species of refractory sulfide ore from the Lone Tree Mine following pressure oxidation according to the present invention. The square grids on FIGS. 10 and 11 are 32 microns on a side.

FIG. 10 shows a photomicrograph of a deeply corroded marcasite fragment (right) and a much less corroded coarse grained pyrite (left). The relatively rough edges of the coarse grained pyrite may be indicative of a perimeter region of arsenic-rich pyrite overgrowth, such as of arsenopyrite, that may have originally covered all or part of the pyrite grain. All remnant samples show a substantial absence of any such perimeter arsenic-rich overgrowth and also a substantial absence of fine grained and medium grained pyrites indicating that these mineralogical species were largely decomposed via sulfide sulfur oxidation during pressure oxidation.

FIG. 11 shows a relatively uncorroded coarse grained pyrite (top center), a deeply corroded marcasite (left of center) and a deeply corroded pyrite (just below center) that may be a remnant of an agglomerate originally containing fine grained pyrite.

FIG. 12 shows remnants of several coarse grained pyrite grains that do not appear to have been appreciably decomposed during pressure oxidation. Again, there is a substantial absence of fine grained pyrites and arsenic-rich perimeter regions, indicating that those mineralogies have been successfully decomposed during the pressure oxidation.

Examples 1–23

Examples 1–23 demonstrate preferential oxidation of sulfide sulfur in first sulfide mineralogies in an ore with which the gold in the ore is primarily associated while sulfide sulfur in second sulfide mineralogies, with which relatively little gold is associated, are preferentially not oxidized.

A composite, gold-bearing refractory sulfide ore was prepared from 51.8 weight percent of a sulfide ore sample from the Valmy deposit, 25.9 percent of a sulfide ore sample from the Antler deposit, and 22.3 percent of a sulfide ore sample from the Havallah deposit. All ore samples are from the Lone Tree Mine in Nevada. A compositional analysis of the ore composite is shown in Table 2. The ore composite comprises significant sulfide sulfur and no significant quantities of carbonates or organic carbon.

TABLE 2

Lone Tree Composite Ore Sample Feed Analysis

| Component | Assay |
|---|---|
| Gold (oz./ton) | 0.182 |
| Arsenic (ppm) | 3366 |
| Total Sulfur (wt %) | 3.59 |
| Sulfide Sulfur (wt %) | 3.10 |

TABLE 2-continued

Lone Tree Composite Ore Sample Feed Analysis

| Component | Assay |
|---|---|
| Mercury (ppm by wt) | 16.2 |
| Carbonates (wt %) | <0.05 |
| Organic Carbon (wt %) | <0.15[1] |

[1]below measurement detection limit of 0.15 wt %

Example 1 is a base cyanidation test without prior pressure oxidation, and shows gold extraction by a cyanide solution of only 38.6 percent. Examples 2–23 demonstrate the effects of various pressure oxidation conditions on the level of sulfide sulfur oxidation and gold extraction.

Figure 4:
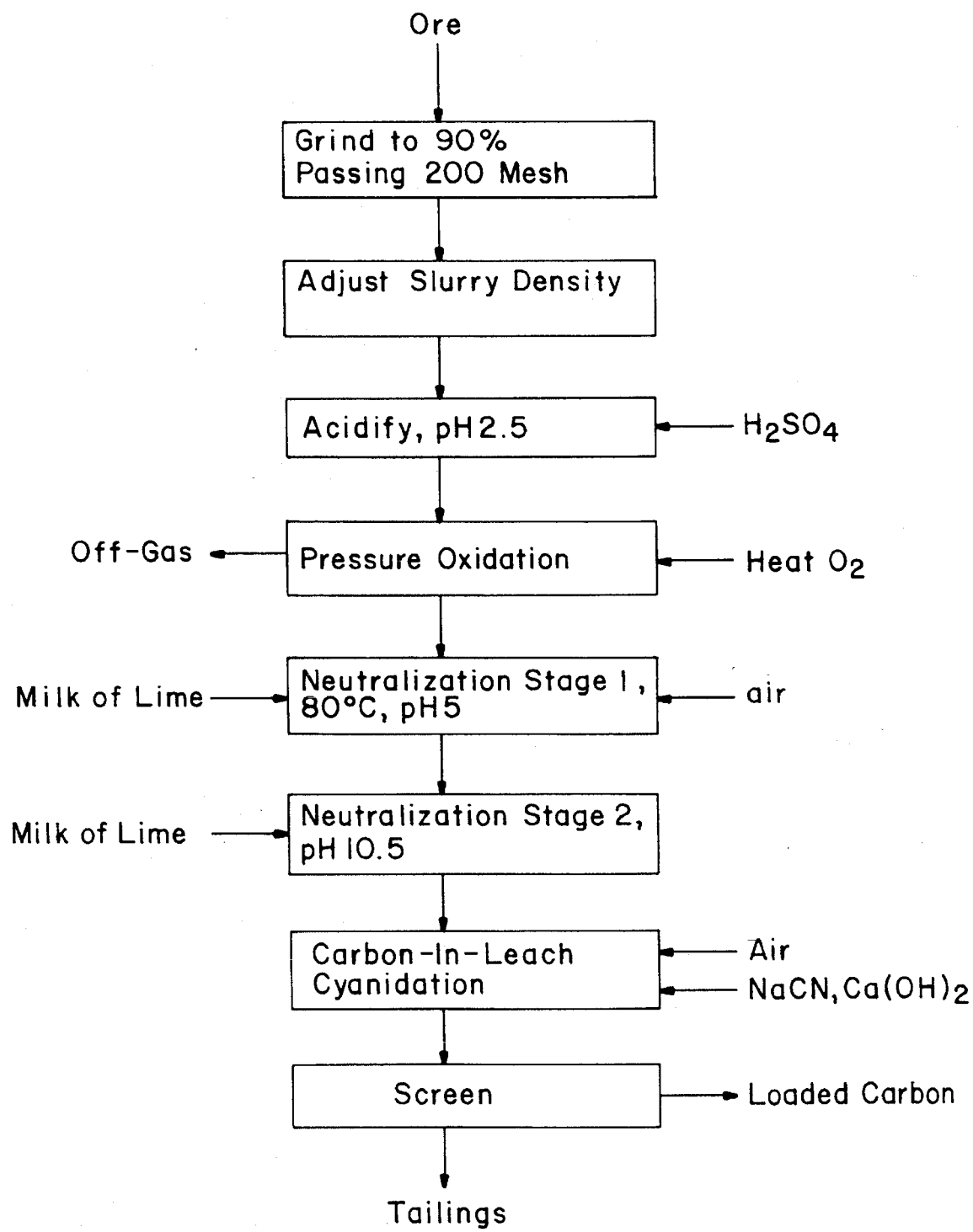
FIG. 4 is a diagram of the experimental procedure used in Examples 1–23.

The test procedure utilized for Examples 2–23 is shown in FIG. 4. The ore composite is first ground to 90 percent passing 200 mesh and the slurry density is adjusted to the desired weight percent of solids. Prior to pressure oxidation, the slurry is acidified using sulfuric acid to a pH of 2.5. The slurry is then subjected to pressure oxidation in a batch, two-liter autoclave with the addition of heat and oxygen gas. Following pressure oxidation, the slurry is neutralized in two stages to a pH of 10.5 and the neutralized slurry is subjected to a carbon-in-leach cyanidation using an initial cyanide concentration of one gram of sodium cyanide per liter of solution and with the addition of air during the cyanidation. Carbon granules loaded with gold are then removed by screening. Tailings passing through the screen are analyzed for residual gold and for oxidation of sulfide sulfur.

Table 3 shows specific operating parameters for tests 2–23 and summarizes the percent sulfide sulfur oxidation and gold extraction for the tests. Table 3 also shows the consumption of lime and sodium cyanide calculated as pounds per ton of ore feed.

TABLE 3

| Example | Temp. (°C.) | Pressure (psig) Total | Pressure (psig) $O_2$ | Time (Min.) | Slurry Solids (wt %) | % S Oxidation | Gold Extraction (%) | Reagents, lb/ton CaO | Reagents, lb/ton NaCN |
|---|---|---|---|---|---|---|---|---|---|
| 1 | N/A | N/A | N/A | N/A | N/A | 0 | 38.6 | 1.7 | |
| 2 | 120 | 42 | 25 | 90 | 50 | 11 | 65.8 | 18 | 2.5 |
| 3 | 120 | 67 | 50 | 45 | 40 | 14 | 66.3 | 14 | 3.8 |
| 4 | 120 | 67 | 50 | 90 | 50 | 19 | 76.6 | 24 | 3.2 |
| 5 | 120 | 67 | 50 | 180 | 40 | 56 | 85.2 | 45 | 8.6 |
| 6 | 150 | 85 | 20 | 180 | 35 | 72 | 89.8 | 66 | 3.0 |
| 7 | 160 | 128 | 50 | 45 | 50 | 37 | 83.8 | 35 | 2.5 |
| 8 | 160 | 103 | 25 | 90 | 50 | 32 | 85.9 | 44 | 3.3 |
| 9 | 160 | 128 | 50 | 90 | 50 | 65 | 89.5 | 45 | 4.3 |
| 10 | 160 | 103 | 25 | 90 | 40 | 54 | 89.9 | 20 | 5.4 |
| 11 | 160 | 103 | 25 | 45 | 40 | 36 | 85.4 | 38 | 5.4 |
| 12 | 160 | 103 | 25 | 45 | 50 | 27 | 85.0 | 31 | 3.9 |
| 13 | 180 | 233 | 100 | 20 | 50 | 40 | 84.9 | 35 | 4.3 |
| 14 | 180 | 233 | 100 | 45 | 50 | 71 | 92.1 | 68 | 3.9 |
| 15 | 180 | 183 | 50 | 45 | 50 | 40 | 87.9 | 43 | 5.2 |
| 16 | 180 | 183 | 50 | 60 | 50 | 50 | 90.0 | 49 | 5.7 |
| 17 | 180 | 183 | 50 | 20 | 50 | 14 | 75.3 | 23 | 3.6 |
| 18 | 200 | 264 | 50 | 20 | 50 | 39 | 85.9 | 39 | 4.3 |
| 19 | 200 | 264 | 50 | 45 | 50 | 45 | 88.0 | | 4.1 |
| 20 | 200 | 314 | 100 | 20 | 50 | 36 | 84.4 | 38 | 4.4 |
| 21 | 200 | 314 | 100 | 60 | 50 | 95 | 94.3 | 84 | 2.1 |
| 22 | 200 | 264 | 50 | 20 | 50 | 14 | 69.8 | 16 | 1.9 |
| 23 | 200 | 314 | 100 | 45 | 50 | 90 | 95.7 | 85 | 2.7 |

Figure 5:
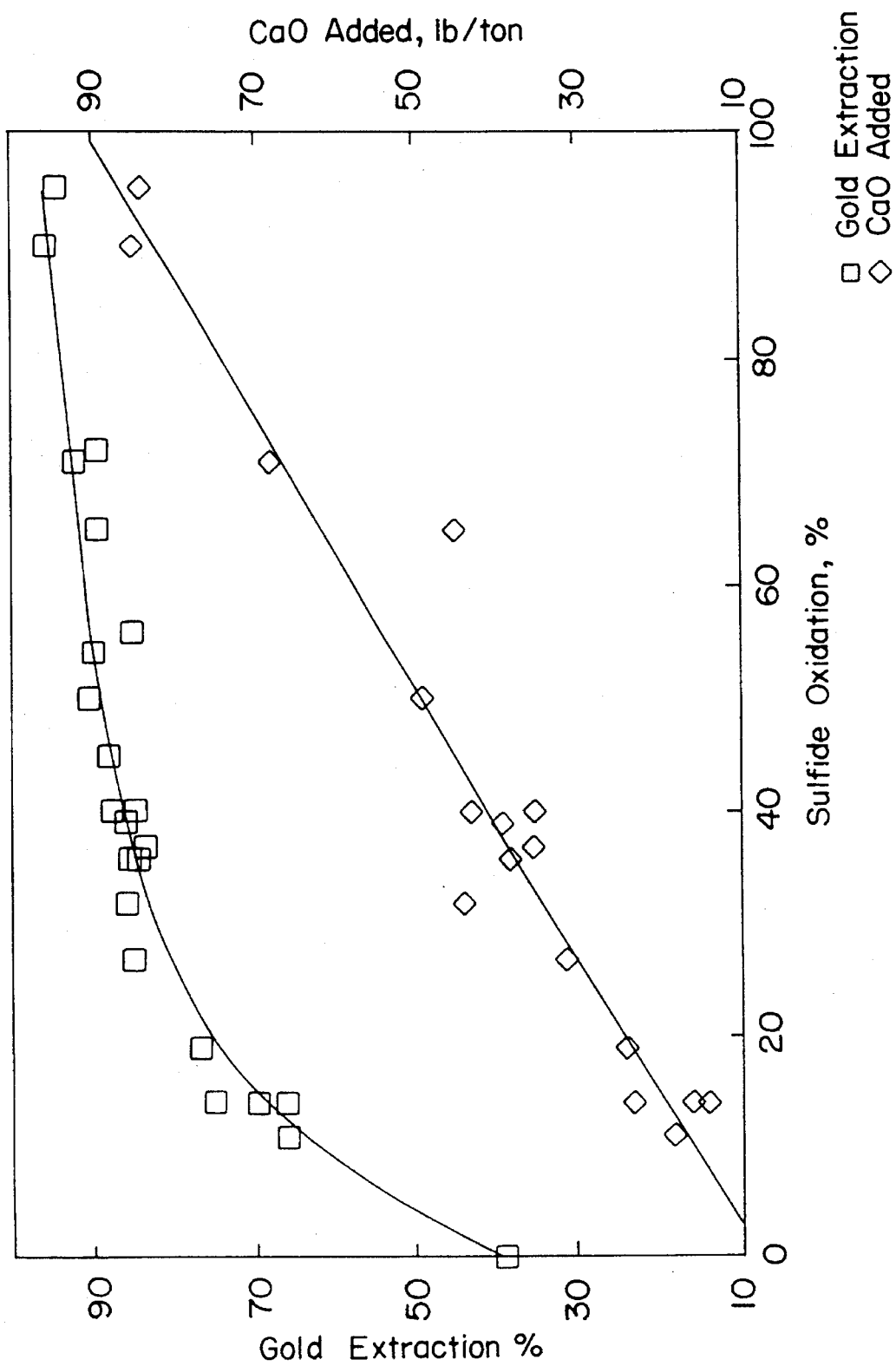
FIG. 5 is a graph of gold extraction and lime consumption versus sulfide sulfur oxidation.

FIG. 5 is a graph prepared from the results of Examples 1–23 showing gold extraction as a function of sulfide sulfur oxidation. Gold extraction increases rapidly with increasing sulfide sulfur oxidation at low oxidation levels. However, above about 40 to 50 percent sulfide sulfur oxidation, gold extractions do not vary appreciably. Approximately 90 percent gold extraction appears attainable at sulfide sulfur oxidation of somewhere between 50 and 60 percent.

As seen in Table 3, the consumption of lime required for neutralization increases as the sulfide sulfur oxidation increases. Such increased lime consumption adds considerably to gold recovery costs.

The results of Tests 2–23 indicate that the process of the present invention is effective at preferentially oxidizing the fine and medium grained pyrites and marcasite and arsenic-rich sulfides, such as arsenous pyrite and arsenopyrite. These mineralogical species contain most of the gold. Left unoxidized is most of the coarse grained pyrite which contains very little gold.

Examples 24–37

Examples 24–37 further demonstrate application of the process of the present invention, including the effect of autoclave temperature, sparging air through the oxidized slurry during neutralization, and using feed water containing concentrations of cyanide and thiocyanate to simulate the use of recycled water from down stream of cyanidation.

A pilot operation is designed in which ore samples are subjected to pressure oxidation followed by carbon-in-leach cyanide recovery of gold. Ore is wet ground to a size of 80 percent passing a 200 mesh screen. Wet grinding occurs at a slurry concentration of 50 weight percent solids. The slurry density is adjusted to 40 weight percent solids and is then fed to a four compartment, horizontal, titanium autoclave measuring about 10 inches in diameter and 36 inches long and having an internal active volume of about 24 liters. Each compartment is mixed with a single radial flow impeller. Approximately 26 pounds per hour of solids are fed to the autoclave during operation at a feed rate of approximately 0.37 liters per minute. The slurry is retained in the autoclave for approximately 60 minutes. Commercial grade oxygen is injected under the agitator in each compartment of the autoclave and the autoclave is heated using external burners to control temperature in the autoclave reactor.

Oxidized slurry exiting the autoclave is neutralized in three stages with the first stage being at a pH of 4.5 and the second and third stages being at a pH of 10.5. Hydrated lime in an aqueous slurry is used as a base material for neutralization in all examples except Example 35, in which a slurry of ground limestone is used in the first stage of neutralization and hydrated lime is used in the subsequent two stages. Air or oxygen is sparged into the neutralization tanks during neutralization of the oxidized slurry, except in Example 24 in which no air or oxygen sparge is used. Following neutralization, the neutralized slurries are subjected to batch carbon-in-leach cyanidation to determine gold extractions with a concentration of sodium cyanide in the solution maintained at approximately 0.5 grams per liter.

Fresh water is used for wet grinding in preparing the feed slurry, except in Examples 26, 27, 36 and 37. In Examples 26 and 27, 50 parts per million of sodium cyanide is added to the grind water and in Examples 36 and 37, 50 parts per million of sodium cyanide and 100 parts per million of sodium thiocyanate are added to the grind water. These additions simulate the use of water containing cyanide and thiocyanate ions in solution representative of the use of water recycled from downstream of cyanidation.

Temperatures were controlled in compartment 2 of the autoclave during pressure oxidation, with the temperature in compartment 1 being as much as 5 degrees cooler and the temperature measured in compartment 4 being 1 or 2 degrees warmer than the controlled temperature.

Two sulfide ore composites were prepared, Composite A and Composite B. Composite A consists of 60 percent of ore from the Havallah deposit, 25 percent of ore from the Antler deposit, and 15 percent of ore from the Valmy deposit, all from the Lone Tree Mine. Composite B consists of one third of each of the Havallah, Antler and Valmy ores. The compositions of Havallah, Antler and Valmy ores used to prepare Composites A and B are shown in Table 4. Table 4 also shows the cyanide soluble gold in each of the three ores.

TABLE 4

| Sample Ore Feed Analyses | | | |
|---|---|---|---|
| Element | Havallah | Antler | Valmy |
| Au (oz./ton) | 0.166 | 0.098 | 0.128 |
| Sulfide S (wt %) | 2.75 | 4.13 | 1.70 |
| Hg (ppm by wt) | 4.1 | 17.2 | 8.8 |
| As (ppm by wt) | 743 | 3110 | 1550 |
| Cyanide Soluble Gold (wt %)[1] | 54.8 | 17.9 | 33.8 |
| Carbonates (wt %) | <0.05 | <0.05 | <0.05 |
| Organic carbon (wt %) | <0.15[2] | <0.15[2] | <0.15[2] |

[1] without prior pressure oxidation
[2] below detection limit of 0.15 wt % for measurement technique used Autoclave operating parameters and gold recoveries are shown in Table 5. Recoveries were substantially lower at 160° C. autoclave temperatures than at the higher temperatures. This is caused by the formation of solid elemental sulfur product in the form of ⅛ inch diameter pyrite-containing prills in the autoclave at the lower temperatures. As the temperatures were increased to 170° C. and 180° C., prill formation was prevented and gold recoveries correspondingly increased.

TABLE 5

| Example | Ore Composite | Autoclave Temperature (°C.)[1] | Autoclave Pressure (psig) Total | Autoclave Pressure (psig) O$_2$ | Neutralization Sparge | Cyanidation Gold Dissolution (%) | NaCN lb/ton |
|---|---|---|---|---|---|---|---|
| 24 | A | 160 | 175 | 100 | none | 85.5 | 5.4 |
| 25 | A | 160 | 175 | 100 | air | 85.4 | 1.9 |
| 26 | A[(2)] | 160 | 175 | 100 | air | 86.8 | 2.0 |
| 27 | A[(2)] | 160 | 175 | 100 | O$_2$ | 86.7 | 2.4 |
| 28 | A | 170 | 205 | 100 | air | 88.5 | 2.0 |
| 29 | A | 170 | 205 | 100 | O$_2$ | 87.9 | 2.1 |
| 30 | A | 180 | 235 | 100 | air | 89.3 | 1.8 |
| 31 | A | 180 | 235 | 100 | O$_2$ | 89.8 | 2.2 |
| 32 | B | 160 | 175 | 100 | air | 84.1 | 2.0 |
| 33 | B | 160 | 175 | 100 | O$_2$ | 83.9 | 2.1 |
| 34 | B | 160 | 175 | 100 | air | 84.0 | 2.0 |
| 35[(4)] | B | 160 | 175 | 100 | air | 83.1 | 2.0 |

TABLE 5-continued

| Example | Ore Composite | Autoclave Temperature (°C.)[1] | Autoclave Pressure (psig) | | Neutralization Sparge | Cyanidation | |
|---|---|---|---|---|---|---|---|
| | | | Total | O₂ | | Gold Dissolution (%) | NaCN lb/ton |
| 36 | B[3] | 160 | 175 | 100 | air | 85.8 | 2.0 |
| 37 | B[3] | 160 | 175 | 100 | O₂ | 85.3 | 2.1 |

[1]As controlled and measured in Compartment No. 2 of the autoclave
[2]50 ppm CN- in slurry to grinder
[3]50 ppm CN- and 100 ppm SCN- in slurry to grinder
[4]Limestone in first neutralization stage and lime in second and third neutralization stages Comparing Example 24 to Examples 25–37 shows that a substantial saving in cyanide consumption is possible by sparging the slurry following pressure oxidation with oxygen gas or air. Air is preferred.

Examples 26, 27, 36 and 37 demonstrate that the use of water in the feed slurry containing significant amounts of dissolved cyanide and/or thiocyanate ions, simulating the use of recycle water, is not detrimental to gold recovery.

Examples 38–44

Examples 38–44 further demonstrate operation of the process of the present invention, including the attainment of high gold recoveries at efficient operating conditions by preferentially oxidizing only those sulfide minerals with which the gold and the ore is predominantly associated.

Examples 38–44 involve operation of the pilot plant as described for Examples 24–37. Air was sparged through the slurry during neutralization. Feed samples included Valmy, Antler and Havallah ore samples as shown in Table 4 and Composite A samples, as previously described.

Autoclave operating conditions and gold dissolution during cyanidation are shown in Table 6. Table 6 also shows the percent oxidation of sulfide sulfur as measured from several samples taken at various times during operation of the pilot plant for each of the pilot plant runs. Temperatures in the autoclave were controlled in compartment 1, with temperatures in the remaining compartments allowed to seek an equilibrium. This resulted in temperatures of as high as 190° in the final compartment in the case of 180° C. controlled temperatures.

As seen in Table 6, gold recoveries of approximately 90 percent are possible with sulfide sulfur oxidation substantially less than 100 percent, indicating successful preferential oxidation of those sulfide sulfur minerals with which gold in the ores is primarily associated.

It should be recognized that any of the embodiments of the present invention described herein can be combined with any of the other embodiments of the present invention described herein. While various embodiments of the present invention have been described in detail, it is apparent that modifications and adaptations of these embodiments will occur to those skilled in the art. It is to be expressly understood, however, that such modifications and adaptations are within the scope of the present invention, as set forth in the following claims.

What is claimed is:

1. A method for recovering gold, the method comprising the steps of:

providing a feed slurry comprising solid particulate material slurried in an aqueous liquid, said solid particulate material comprising gold and sulfide minerals, said sulfide minerals comprising sulfide sulfur;

subjecting said feed slurry to pressure oxidation in the presence of oxygen gas to form an oxidized slurry, said pressure oxidation being at a temperature of from about 155° C. to about 180° C. and a total pressure of from about 100 psig to about 260 psig;

after said pressure oxidation, contacting said oxidized slurry with an oxidizing agent at a reduced temperature and reduced pressure relative to the temperature and pressure of said pressure oxidation, wherein said con-

TABLE 6

| Example | Feed Ore | Autoclave Temperature (°C.)[1] | Autoclave Pressure (psig) | | Sulfide Sulfur Oxidation (%)[2] | Cyanidation | |
|---|---|---|---|---|---|---|---|
| | | | Total | O₂ | | Gold Dissolution (%)[3] | NaCN lb/ton |
| 38 | Valmy | 160 | 175 | 100 | 65.2–72.2 | 89.2 | 2.2 |
| 39 | Antler | 160 | 175 | 100 | 74.1–78.8 | 78.1 | 1.9 |
| 40 | Antler | 180 | 235 | 100 | 86.2–89.4 | 88.5 | 2.5 |
| 41 | Havallah | 160 | 175 | 100 | 44.9–51.8 | 88.3 | 2.0 |
| 42 | Havallah | 180 | 235 | 100 | 61.1–67.6 | 92.1 | 2.2 |
| 43 | Comp. A | 160 | 175 | 100 | 50.9–63.4 | 86.3 | 1.5 |
| 44 | Comp. A | 180 | 235 | 100 | 56.9–74.4 | 89.9 | 1.7 |

[1]As controlled and measured in the first compartment of the autoclave
[2]Range of measurements for several samples taken at various times during pilot plant operation
[3]Average of samples taken at various times during pilot plant operation tacting comprises sparging said oxidized slurry with a gas comprising said oxidizing agent; and after said contacting, recovering at least a portion of said gold from said oxidized slurry by contacting said oxidized slurry with a cyanide to form a complex of a portion of said gold with said cyanide, wherein said recovering comprises separating at least a portion of said complex of said gold with said cyanide from said oxidized slurry.

2. The method of claim 1, wherein:

during said pressure oxidation, at least a portion of said sulfide sulfur is oxidized to a sulfate.

3. The method of claim 1, wherein:

during said pressure oxidation, a portion of said sulfide sulfur is oxidized, with said portion being less than about 85 percent of said sulfide sulfur in said feed slurry.

4. The method of claim 1, wherein:

during said pressure oxidation, a portion of said sulfide sulfur is oxidized, with said oxidized portion being from about 20 percent to about 80 percent of said sulfide sulfur in said feed slurry.

5. The method of claim 1, wherein:

during said pressure oxidation, a portion of said sulfide sulfur is oxidized, with said oxidized portion being from about 40 percent to about 80 percent of said sulfide sulfur in said feed slurry.

6. The method of claim 1, wherein:

said pressure oxidation is operated at a temperature of from about 160° C. to about 180° C. and wherein a portion of said sulfide sulfur is oxidized, said oxidized portion being less than about 80 percent of said sulfide sulfur in said feed.

7. The method of claim 1, wherein:

said oxidized slurry comprises ferrous iron and during said contacting of said oxidized slurry with said oxidizing agent, at least a portion of said ferrous iron is oxidized to ferric iron and wherein said oxidizing agent comprises air.

8. The method of claim 1, wherein:

said oxidized slurry comprises ferrous iron and during said contacting of said oxidized slurry with said oxidizing agent, at least a portion of said ferrous iron is oxidized to ferric iron, and said oxidizing agent comprises gaseous oxygen.

9. The method of claim 8, wherein:

said oxidizing agent comprises air which is contacted with said oxidized slurry in an amount of greater than about 400 standard cubic feet of air per ton of solid particulate material in said feed slurry.

10. The method of claim 8, wherein:

said oxidizing agent comprises air which is contacted with said oxidized slurry in an amount of greater than about 500 standard cubic feet of air per ton of solid particulate material in said feed slurry.

11. The method of claim 1, wherein:

during said pressure oxidation, a portion of said sulfide sulfur is oxidized, said portion being less than about 80 percent of said sulfide sulfur in said feed slurry, the remainder of said sulfide sulfur remaining unoxidized; and said oxidized slurry comprises ferrous iron and during said contacting of said oxidized slurry with said oxidizing agent, at least a portion of said ferrous iron is oxidized to ferric iron.

12. The method of claim 1, wherein:

said pressure oxidation is at a temperature of from about 155° C. to about 178° C.

13. The method of claim 1, wherein:

said pressure oxidation is at a total pressure of from about 125 psig to about 260 psig.

14. The method of claim 1, wherein:

said pressure oxidation is at a total pressure of from about 190 psig to about 260 psig.

15. The method of claim 1, wherein:

said pressure oxidation is at an oxygen overpressure of from about 25 psig to about 125 psig.

16. The method of claim 1, wherein:

said pressure oxidation is at an oxygen overpressure of from about 50 psig to about 125 psig.

17. The method of claim 1, wherein:

said separating at least a portion of said complex of said gold with said cyanide from said oxidized slurry results in a tailing stream comprising tailing particles and aqueous tailing liquid having cyanide in solution, at least a portion of said aqueous tailing liquid from said tailing stream being recycled as a recycled aqueous tailing livid to form a part of said feed slurry without treating said recycled aqueous tailing liquid for reduction of the amount of cyanide in said recycled aqueous tailing liquid.

18. The method of claim 1, wherein:

said solid particulate material comprises gold bearing ore.

19. The method of claim 1, wherein:

said feed slurry is in the absence of added acid prior to said pressure oxidation.

20. The method of claim 1, wherein:

after said pressure oxidation, the pH of said oxidized slurry is increased by the addition of base material to said oxidized slurry in multiple stages in series, with base material being added during each of said multiple stages.

21. The method of claim 20, wherein:

in a first stage of said multiple stages, the pH of said oxidized slurry is increased to a pH of from about 3.5 to about 5, and in a stage of said multiple stages subsequent to said first stage the pH of said oxidized slurry is increased to a pH greater than about 10.

22. The method of claim 1, wherein:

said sulfide minerals comprise a first sulfide mineral containing a first gold concentration and a second sulfide mineral containing a second gold concentration that is lower than said first gold concentration, wherein said first sulfide mineral comprises first sulfide sulfur and said second sulfide mineral comprises second sulfide sulfur, and wherein said first sulfide sulfur is more susceptible to pressure oxidation than said second sulfide sulfur in that greater than about 70 percent of said first sulfide sulfur can be oxidized while oxidizing less than about 30 percent of said second sulfide sulfur at a pressure oxidation temperature of from about 155° C. to about 180° C.; and during said pressure oxidation lasts only for a time such that said first sulfide sulfur is preferentially oxidized, with greater than about 70 percent of said first sulfide sulfur being oxidized and less than about 30 percent of said second sulfide sulfur being oxidized.

23. The method of claim 22, wherein:

said first sulfide mineral comprises an arsenic-containing sulfide material and said second sulfide mineral comprises pyrite.

24. The method of claim 22, wherein:

said first sulfide mineral comprises marcasite and said second sulfide mineral comprises pyrite.

25. The method of claim 22, wherein:

said first sulfide mineral comprises a first pyrite and said second sulfide mineral comprises a second pyrite, wherein said first pyrite has a smaller average grain size than said second pyrite.

26. The method of claim 25, wherein:

said first pyrite comprises average grain sizes smaller than about 10 microns and said second pyrite comprises average grain sizes larger than about 20 microns.

27. The method of claim 1, wherein:

said sulfide minerals comprise a first sulfide mineral containing a first gold concentration and a second sulfide mineral containing a second gold concentration that is lower than said first gold concentration, wherein said first sulfide mineral comprises first sulfide sulfur and said second sulfide mineral comprises second sulfide sulfur, and wherein said first sulfide sulfur is more susceptible to pressure oxidation than said second sulfide sulfur in that greater than about 70 percent of said first sulfide sulfur can be oxidized while oxidizing less than about 30 percent of said second sulfide sulfur at a pressure oxidation temperature of from about 155° C. to about 180° C.; and said pressure oxidation lasts only for a time such that said first sulfide sulfur is preferentially oxidized, with greater than about 80 percent of said first sulfide sulfur being oxidized and less than about 20 percent of said second sulfide sulfur being oxidized.

28. The method of claim 1, wherein:

said feed slurry is subjected to said pressure oxidation for a time of from about 15 minutes to about 60 minutes.

29. The method of claim 1, wherein:

in said step of recovering, greater than about 80 percent of said gold originally in said feed slurry is complexed with said cyanide and thereafter converted to a purified metallic gold product.

30. The method of claim 1, wherein:

in said step of recovering, greater than about 85 percent of said gold originally in said feed slurry is complexed with said cyanide and thereafter converted to a purified metallic gold product.

31. The method of claim 1, wherein:

in said step of recovering, greater than about 90 percent of said gold originally in said feed slurry is complexed with said cyanide and thereafter converted to a purified metallic gold product.

32. A method for recovering gold, the method comprising the steps of:

providing a feed slurry comprising solid particulate material slurried in an aqueous liquid, said particulate material comprising gold and sulfide minerals, said sulfide minerals comprising sulfide sulfur, wherein said sulfide minerals comprise a first sulfide mineral and a second sulfide mineral, wherein said first sulfide mineral has first sulfide sulfur and said second sulfide mineral has second sulfide sulfur, and wherein said first sulfide sulfur is more susceptible to pressure oxidation than said second sulfide sulfur in that greater than about 70 percent of said first sulfide sulfur can be oxidized while oxidizing less than about 30 percent of said second sulfide sulfur at a pressure oxidation temperature of from about 155° C. to about 180° C.;

subjecting said feed slurry to pressure oxidation in the presence of oxygen gas at a temperature of from about 155° C. to about 180° C. and only for a time such that less than about 80 percent of sulfide sulfur in said feed slurry is oxidized, with greater than about 70 percent of said first sulfide sulfur being oxidized and less than about 30 percent of said second sulfide sulfur being oxidized, to form an oxidized slurry;

contacting said oxidized slurry with a cyanide to convert at least a portion of said gold originally in said feed slurry to a cyanide complex; and separating at least a portion of said cyanide complex from said oxidized slurry and recovering in a purified metallic gold product at least about 80 percent of said gold originally in said feed slurry.

33. The method of claim 32, wherein:

at least about 85 percent of said gold originally in said feed slurry is recovered in a purified metallic gold product.

34. The method of claim 32, wherein:

at least about 90 percent of said gold originally in said feed slurry is recovered in a purified metallic gold product.

35. The method of claim 32, wherein:

said first sulfide mineral contains a first gold concentration and said second sulfide mineral contains a second gold concentration that is lower than said first gold concentration.

36. The method of claim 32, wherein:

said first sulfide mineral comprises an arsenic-containing sulfide material and said second sulfide mineral comprises a pyrite.

37. The method of claim 32, wherein:

said first sulfide mineral comprises marcasite and said second sulfide mineral comprises pyrite.

38. The method of claim 32, wherein:

said first sulfide mineral comprises a first pyrite having a first average grain size and said second sulfide mineral comprises a second pyrite having a second average grain size that is larger than the said first average grain.

39. The method of claim 38, wherein:

said first average grain size is smaller than about 10 microns and said second average grain size is larger than about 20 microns.

40. The method of claim 32, wherein:

said first sulfide mineral comprises a first internal porosity and said second sulfide mineral comprises a second internal porosity that is smaller than said first internal porosity.

41. The method of claim 40, wherein:

said first internal porosity comprises vugular cavities in said first sulfide mineral.

42. The method of claim 40, wherein:

said first internal porosity comprises fractures in said first sulfide mineral.

43. The method of claim 32, wherein:

following said subjecting said feed slurry to pressure oxidation, said oxidized slurry has a pH of less than about 1.5.

44. A method for recovering gold, the method comprising the steps of:

providing a feed slurry comprising solid particulate material slurried in an aqueous liquid, said solid particulate material comprising gold and sulfide minerals having sulfide sulfur, said gold being contained within said sulfide minerals in the form of gold masses of a size smaller than about 1000 angstroms, wherein said sulfide minerals comprise a first sulfide mineral containing a first gold concentration and a second sulfide mineral containing a second gold concentration that is lower than said first gold concentration, wherein said first sulfide mineral comprises first sulfide sulfur and said second sulfide mineral comprises second sulfide sulfur, and wherein said first sulfide sulfur is more susceptible to pressure oxidation than said second sulfide sulfur in that greater than about 70 percent of said first sulfide sulfur can be oxidized while oxidizing less than about 30 percent of said second sulfide sulfur at a pressure oxidation temperature of from about 155° C. to about 180° C.;

subjecting said feed slurry to pressure oxidation in the presence of oxygen gas to form an oxidized slurry, said pressure oxidation being at a temperature of from about 155° C. to about 180° C., a total pressure of from about 100 psig to about 260 psig, an oxygen gas overpressure of from about 25 psig to about 125 psig and for a time such that said first sulfide sulfur is preferentially oxidized, with greater than about 80 percent of said first sulfide sulfur being oxidized and less than about 30 percent of said second sulfide sulfur being oxidized; and recovering at least a portion of said gold from said oxidized slurry.

45. The method of claim 44, wherein:

during said pressure oxidation, a portion of said sulfide sulfur is oxidized, with said portion being from about 20 percent to about 80 percent of said sulfide sulfur in said feed slurry.

46. The method of claim 44, wherein:

said gold masses are of a size smaller than about 500 angstroms.

47. The method of claim 44, wherein:

said gold masses are of a size smaller than about 100 angstroms.

48. The method of claim 44, wherein:

said gold masses are of a size smaller than about 10 angstroms.

49. The method of claim 44, wherein:

during said recovering step, at least about 85 percent of said gold originally in said feed slurry is recovered in a purified metallic gold product.

50. A method for recovering gold, the method comprising the steps of:

providing a feed slurry comprising solid particulate material slurried in an aqueous liquid, said solid particulate material comprising gold and sulfide minerals, said sulfide minerals comprising sulfide sulfur;

subjecting said feed slurry to pressure oxidation in the presence of oxygen gas to form an oxidized slurry having a pH of less than about 1.5, said pressure oxidation being at a temperature of from about 160° C. to about 180° C., a total pressure of from about 125 psig to about 260 psig, an oxygen gas overpressure of from about 50 psig to about 125 psig and for a time sufficient to oxidize a portion of said sulfide sulfur, said portion being from about 20 percent to about 80 percent of sulfide sulfur in said feed slurry; and recovering from said oxidized slurry in a purified metallic gold product at least about 85 percent of said gold originally in said feed slurry.

51. A method for recovering gold, the method comprising the steps of:

providing a feed slurry having solid particulate material slurried in an aqueous liquid, said solid particulate material comprising gold and sulfide minerals, at least a portion of said sulfide minerals comprising sulfide sulfur, arsenic and iron;

subjecting said feed slurry to pressure oxidation at elevated pressure and temperature in the presence of oxygen gas to form an oxidized slurry, said oxidized slurry comprising iron and arsenic in solution in aqueous liquid of said oxidized slurry;

after said pressure oxidation, first raising the pH of said oxidized slurry to a first pH of from about 3.5 to about 5 in a first neutralization stage and maintaining said oxidized slurry at said first pH for at least about 30 minutes, during said first neutralization stage at least about 90 percent of said arsenic being precipitated as ferric arsenate;

after said first raising of said pH, second raising said pH to a second pH of greater than about 10 in a second neutralization stage;

after said second raising of said pH, contacting at least a portion of said gold in said oxidized slurry with a cyanide to form a cyanide complex and thereafter converting at least a portion of said cyanide complexed gold to a purified metallic gold product.

52. A method for recovering gold, the method comprising the steps of:

providing a feed slurry comprising solid particulate material slurried in an aqueous liquid, said solid particulate material comprising gold and sulfide minerals, at least a portion of said sulfide minerals comprising sulfide sulfur, arsenic and iron;

wherein said sulfide minerals comprise a first sulfide mineral containing a first gold concentration and said sulfide minerals comprise a second sulfide mineral containing a second gold concentration that is lower than said first gold concentration, wherein said first sulfide mineral comprises first sulfide sulfur and said second sulfide mineral comprises second sulfide sulfur, and wherein said first sulfide sulfur is more susceptible to pressure oxidation than said second sulfide sulfur in that greater than about 70 percent of said first sulfide sulfur can be oxidized while oxidizing less than about 30 percent of said second sulfide sulfur at a pressure oxidation temperature of from about 155° C. to about 180° C.;

subjecting said feed slurry to pressure oxidation in the presence of oxygen gas to form an oxidized slurry, said pressure oxidation being at a temperature of from about 160° C. to about 180° C., a total pressure of from about 125 psig to about 260 psig, an oxygen gas overpressure of from about 50 psig to about 125 psig and only for a time such that, during said pressure oxidation, said first sulfide sulfur is preferentially oxidized, with greater than about 80 percent of said first sulfide sulfur being oxidized and less than about 30 percent of said second sulfide being oxidized, and with less than about 80 percent of all sulfide sulfur in said feed slurry being oxidized, during said oxidation at least a portion of said arsenic and at least a portion of said iron being dissolved into said aqueous liquid;

after said pressure oxidation, raising the pH of said oxidized slurry in a plurality of stages in series, the pH of said oxidized slurry exiting a first stage of said plurality of stages being from about 3.5 to about 5, the pH of said oxidized slurry exiting a last stage of said plurality of stages being greater than about 10, during said first stage arsenic is precipitated from aqueous liquid of said oxidized slurry, as ferric arsenate;

after said pressure oxidation, contacting said oxidized slurry with an oxidizing agent under substantially unpressurized conditions by sparging said oxidized slurry with a gas comprising said oxidizing agent, said oxidized slurry comprising ferrous iron in solution in aqueous liquid of said oxidized slurry, during said contacting, at least a portion of said ferrous iron being oxidized to ferric iron;

after the raising of the pH, contacting at least a portion of said gold in said oxidized slurry with a cyanide to form a cyanide complex with at least a portion of said gold;

recovering from said oxidized slurry at least a portion of said gold that is complexed with said cyanide.

53. The method of claim 52, wherein:

said oxidizing agent is oxygen gas present in air, during said contacting step said oxidized slurry being treated with greater than about 500 cubic feet of air per ton of solid particulate material in said feed slurry.

54. A method for recovering gold, the method comprising the steps of:

providing a feed slurry comprising solid particulate material slurried in an aqueous liquid, said solid particulate material comprising gold and sulfide minerals, said sulfide minerals comprising sulfide sulfur;

in the absence of added acid in said feed slurry, subjecting said feed slurry to pressure oxidation at elevated temperature and pressure in the presence of oxygen gas to form an oxidized slurry, with said pressure oxidation lasting only for a time such that a portion of said sulfide sulfur is oxidized, said portion being from about 20 percent to about 80 percent of said sulfide sulfur in said feed slurry;

after said pressure oxidation, raising the pH of said oxidized slurry by the addition of a base material to said oxidized slurry in a plurality of stages in series, with said base material being added during each of said plurality of stages;

after said pressure oxidation, contacting said oxidized slurry with an oxidizing agent at a reduced pressure relative to said pressure oxidation by sparging said oxidized slurry with a gas comprising said oxidizing agent;

after said raising of the pH, contacting at least a portion of said gold in said oxidized slurry with a cyanide to form a cyanide complex with at least a portion of said gold;

recovering from said oxidized slurry at least a portion of said gold that is complexed with cyanide to form a tailing stream, said tailing stream comprising solid tailing particles and aqueous tailing liquid having cyanide in solution;

recycling to form a part of said feed slurry at least a portion of said aqueous tailing liquid as a recycled aqueous tailing liquid without treating said recycled aqueous tailing liquid for reduction of the amount of cyanide in solution in said recycled aqueous liquid.

\* \* \* \* \*